(12) United States Patent
Barthold

(10) Patent No.: US 7,546,680 B2
(45) Date of Patent: Jun. 16, 2009

(54) SYSTEMS, METHODS AND APPARATUS FOR TRANSMISSION LINE RE-CONDUCTORING

(76) Inventor: Lionel O. Barthold, 10 Wood Point La., Lake George, NY (US) 12845

( * ) Notice: Subject to any disclaimer, the term of this patent is extended or adjusted under 35 U.S.C. 154(b) by 109 days.

(21) Appl. No.: 11/621,518

(22) Filed: Jan. 9, 2007

(65) Prior Publication Data

US 2007/0158093 A1    Jul. 12, 2007

Related U.S. Application Data

(60) Provisional application No. 60/757,644, filed on Jan. 10, 2006.

(51) Int. Cl.
*H01R 43/00*    (2006.01)
(52) U.S. Cl. .............. 29/745; 29/755; 29/868; 29/869
(58) Field of Classification Search .............. 29/745, 29/755, 868, 869
See application file for complete search history.

(56) References Cited

U.S. PATENT DOCUMENTS

| | | | | |
|---|---|---|---|---|
| 2,301,266 A | * | 11/1942 | Fox | 29/869 |
| 3,708,779 A | * | 1/1973 | Enright et al. | 439/392 |
| 4,661,662 A | * | 4/1987 | Finke et al. | 200/48 R |
| 4,814,550 A | * | 3/1989 | Newberg | 174/138 R |
| 4,817,682 A | * | 4/1989 | Williams | 140/113 |
| 5,359,167 A | * | 10/1994 | Demissy et al. | 200/48 R |
| 5,507,471 A | * | 4/1996 | Mercurio | 254/214 |
| 5,661,903 A | * | 9/1997 | Mercurio | 29/868 |
| 2005/0133244 A1 | | 6/2005 | Devine et al. | |

FOREIGN PATENT DOCUMENTS

WO    WO 2004/079877    9/2004

OTHER PUBLICATIONS

Black, R.C., et al., A Live Line Method for Retensioning Transmission Line Conductors, CIGRE, Int'l Conference, 1970 Session, Aug. 24-Sep. 2.
IEEE Guide to the Installation of Overhead Transmission Line Conductors, IEEE Std. 524-2003, Published Mar. 12, 2004.

* cited by examiner

*Primary Examiner*—C. J Arbes
(74) *Attorney, Agent, or Firm*—Brian M. Dingman; Mirick, O'Connell, DeMallie & Lougee, LLP

(57) ABSTRACT

A method and associated equipment for replacing existing overhead transmission line conductors with new ones while the transmission line remains in service and carrying power. The invention uses the old conductor to pull the new conductor through a series of sheaves installed at the bottom of each tower insulator. Conventional tension-stringing principles are used to assure that both the old and new conductors maintain a safe distance from ground. To achieve this, both the pulling and tensioning (braking) equipment, as well as supply and take-up reels or drums may be elevated to power line voltage and the current is transferred between new conductor and old, while in transit to the line, by means of a brush system and a conducting wheel which may or may not be integral with pulling and tensioning equipment.

5 Claims, 35 Drawing Sheets

FIG. 27A Top View

FIG. 27B Side View

FIG. 27C End View

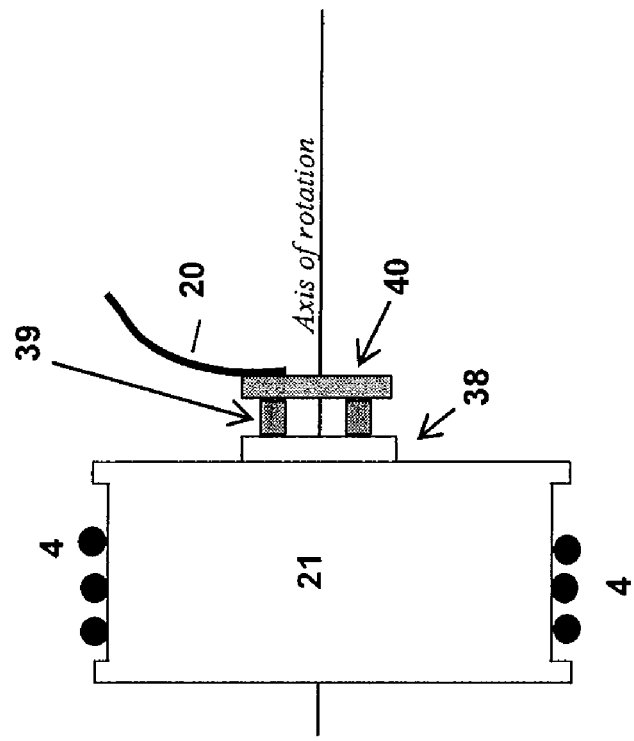
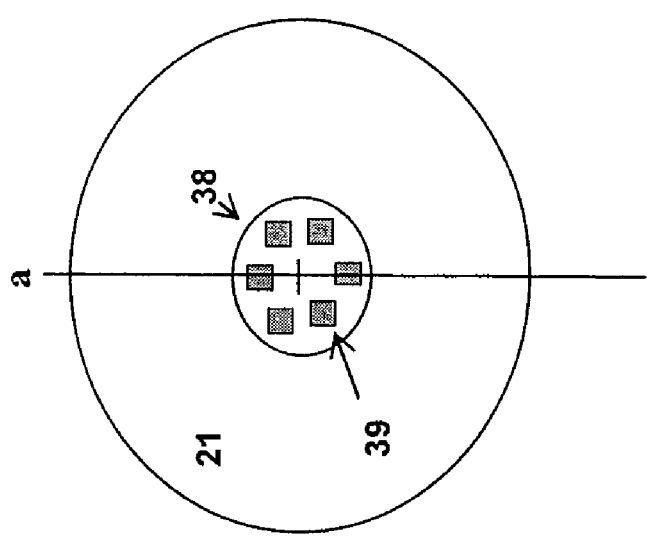
FIG. 28A
FIG. 28B
FIG. 28

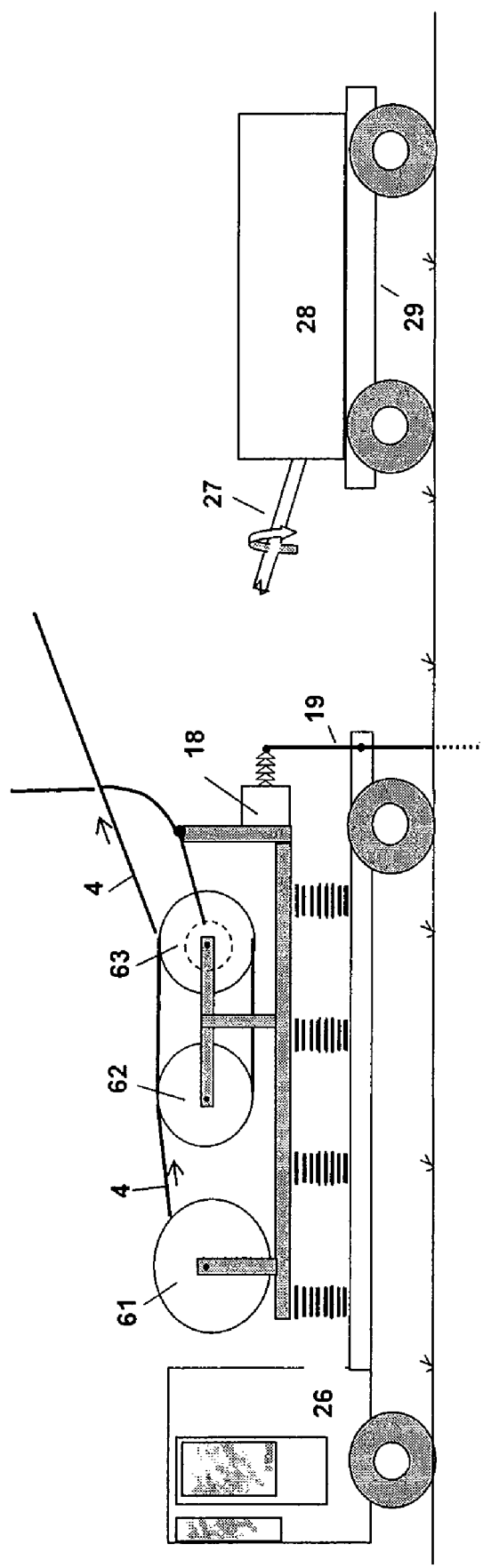

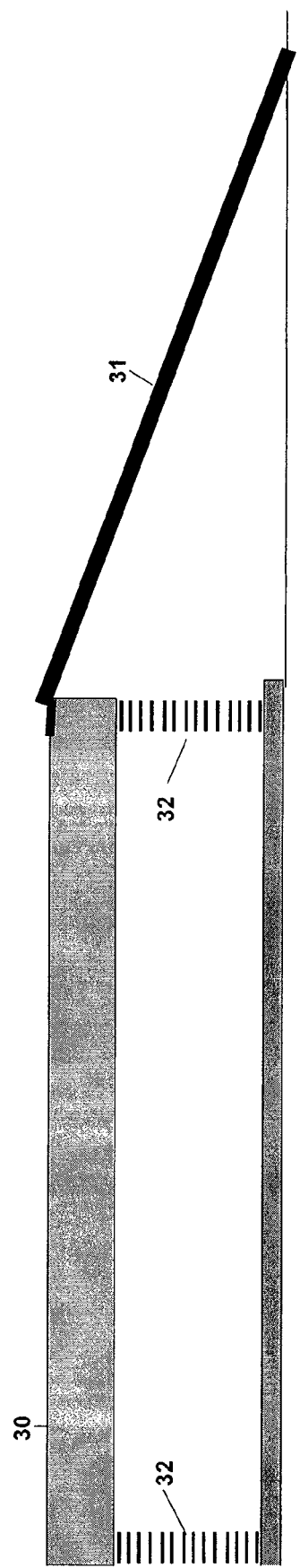

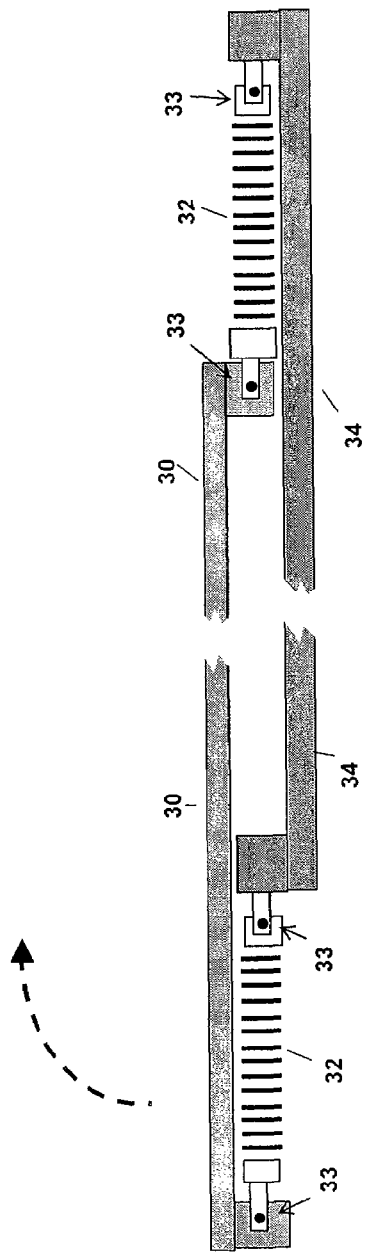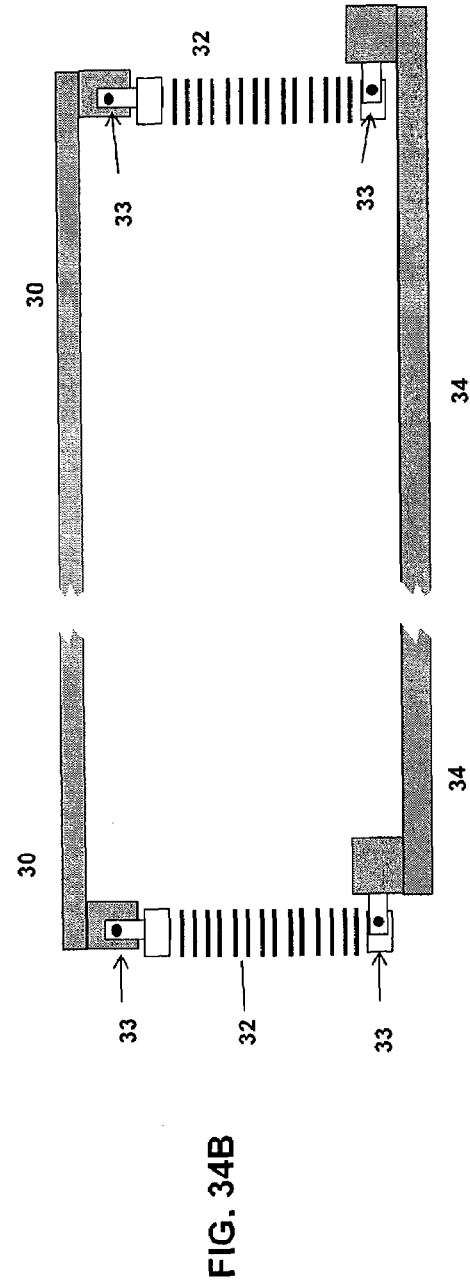
FIG. 34A
FIG. 34B
FIG. 34

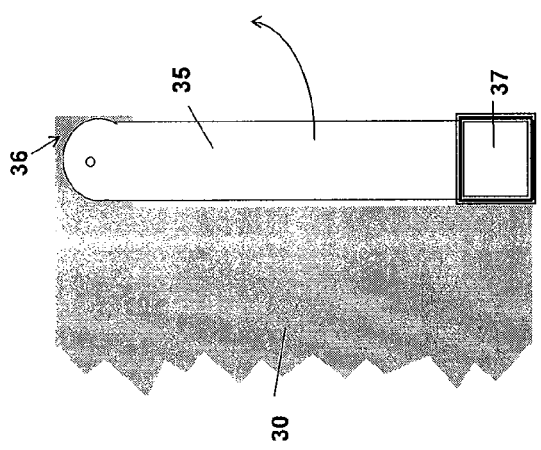
FIG. 35A
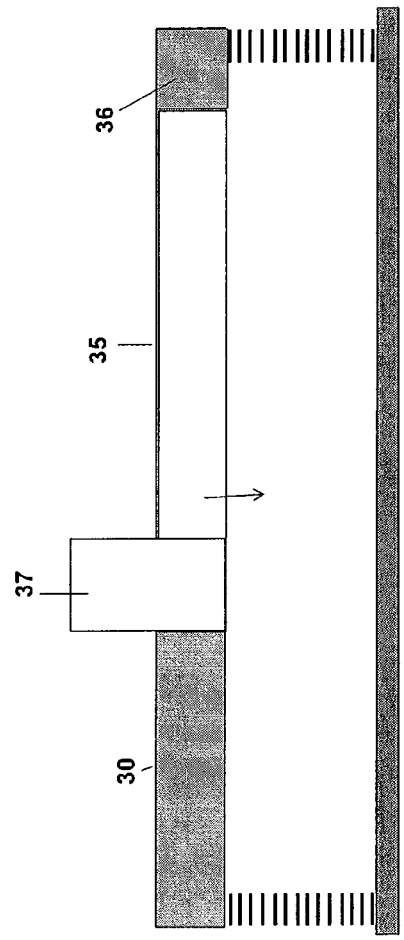
FIG. 35B
FIG. 35

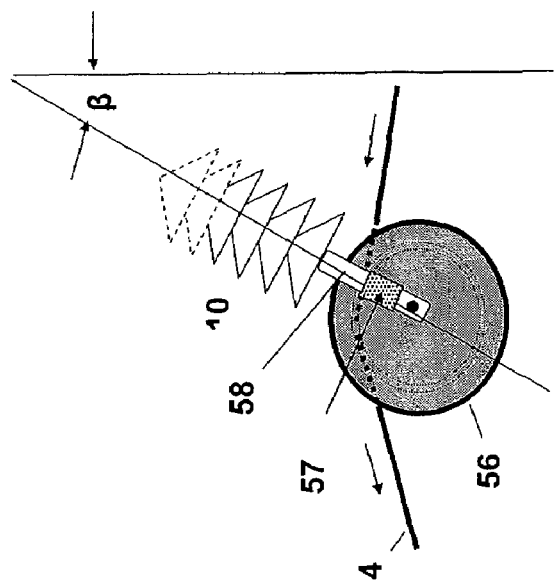
FIG. 38C
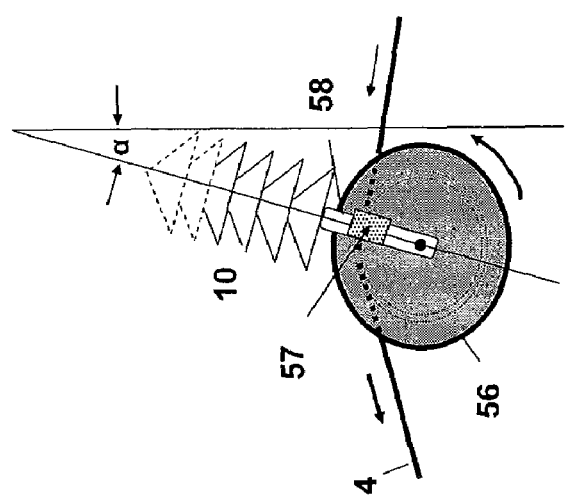
FIG. 38B
FIG. 38
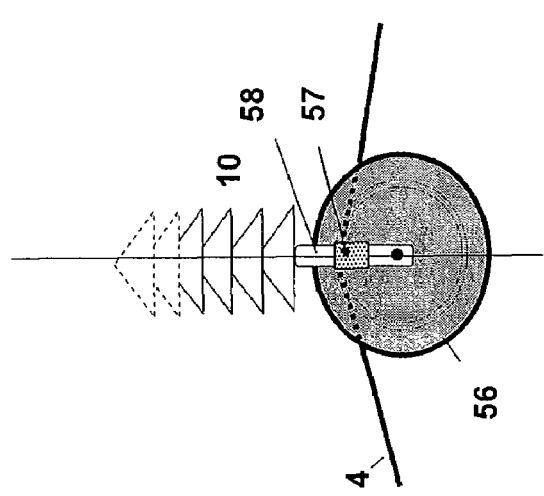
FIG. 38A

SYSTEMS, METHODS AND APPARATUS FOR TRANSMISSION LINE RE-CONDUCTORING

CROSS REFERENCE TO RELATED APPLICATION

This application claims priority of Provisional Patent Application Ser. No. 60/757,644 filed Jan. 10, 2006, the disclosure of which is incorporated herein by reference.

FIELD OF THE INVENTION

This invention pertains to the installation of electrical cables or conductors onto towers of high voltage electric power lines. More specifically, the invention is directed to the installation of new conductors by using the existing or old conductor to draw the replacement or new conductor into place. The invention also permits the replacement operation to be carried out while the electric power line remains in service and energized at high voltage. The invention draws on methods and equipment already in use and well defined in the prior art for working on high voltage lines while the lines are energized, referred to in the trade as "live-line maintenance."

BACKGROUND OF THE INVENTION

In many electric power networks, the growth in generating capacity has outstripped the growth in construction of new transmission lines. This has caused power system design specialists to seek ways to allow existing transmission lines to carry more power. One means of doing so is the replacement of old conductors with new conductors of higher current-carrying capacity. The new conductors may simply be larger if the towers are capable of carrying the extra weight and wind loading. Where the towers are not capable of doing so, special conductors capable of carrying more current with the same or less elongation are now available. These special conductors allow operation at a much higher temperature without posing a safety hazard by exceeding sag limits. Unfortunately, the lines which are the most urgent candidates for re-conductoring are also those which are the most difficult to remove from service, a problem which this invention addresses.

DESCRIPTION OF THE PRIOR ART

The field of prior art deals largely with methods and equipment for putting transmission line conductors into place (stringing) before a line has been commissioned and energized with voltage. The prior art has evolved to the point where it is common to transfer the conductor directly from the conductor supply reel to its overhead position by means of a transportable "tensioner" or brake at the conductor supply end and a transportable "puller" or winch at the conductor pulling end. The tensioner provides sufficient resistance to the pulling force to assure that the conductor does not touch the ground, thus avoiding nicks and scratches that are sources of electrical discharges or corona once the conductor is energized. Tension stringing equipment is supplied by a number of commercial enterprises, e.g., TSE International of Shreveport, La. (www.tse-international.com). Procedures are well established and documented, as for example in the reference *IEEE Guide to the Installation of Overhead Transmission Line Conductors*, Product No: SH95170.

FIG. 1 illustrates the context of a conventional prior art conductor stringing operation which, in this case is presumed to proceed from right to left. It presumes that tower 100 and all towers to the right of tower 100 have been strung and attached to the bottom of insulator strings 10 with permanent clamps 13. It presumes that a section of line between towers 101 and 200 is now to be strung and that tower 201 and those to the left of tower 201 will be strung in a subsequent stringing operation. Towers 100 and 101 are adjacent to one another, as are towers 200 and 201. Stringing blocks 14 have been affixed to the bottom of insulator strings 10 on towers 101 through 200, and a lead cable 11 has been threaded through them in preparation for stringing. Stringing blocks 14 have two sheaves per conductor at the terminating towers, 101 and 200, one sheave per conductor on intermediate towers (not shown).

In FIG. 2, the conductor 4, already installed on the line section to the right of tower 100 been temporarily tied to anchor 12 to sustain tension. New conductor 4 is now being fed from the supply reel 61 of tensioner 60, pulled into place onto tower 101 and the line section between tower 101 and 200 by means of lead cable 11 which is being pulled from the tower 200 position, not shown in this figure. The tensioner 60 must maintain sufficient tension to prevent the new conductor 4 from sagging to the ground between adjacent spans of the line section 101 to 200. The new conductor 4 is connected to lead cable 11 by means of prior art coupler 7. The exact length of the pull represented by section 101 to 200 will depend on the amount of conductor on supply reel 61 but is typically 5,000 to 15,000 feet. In the process of replacing stringing blocks 14 by permanent clamps 13, the exact sag of each span between towers has been adjusted to its design value.

FIG. 3 shows the pulling end of the prior art operation illustrated in FIG. 2. In FIG. 3, new conductor 4 has already been pulled through stringing blocks (not shown) on all towers between 101 and 200, but has not yet been pulled through tower 200. Puller 70 consists of an engine (not shown) that drives one or more bull wheels 72 and 73 around which lead cable 11 makes multiple turns so as to gain the friction needed for the pulling function. Lead cable 11 is coiled around take-up reel 71 for reuse on the next pulling section.

Bull wheels 62 and 63, and supply reel 61, of tensioner 60 shown in FIG. 1, are typically mounted on special vehicles, which are prior art with respect to conductor installation practice. For purposes of this illustration they are shown in FIG. 2 simply as platforms 65 and 66. Similarly, bull wheels 72 and 73, and take-up reel 71, of puller 70 in FIG. 3 are also typically mounted on prior art special vehicles but are shown in the figure as simply platforms 75 and 76. Platforms 75 and 76 may be mounted on one and the same vehicle.

In addition to the above prior art, dealing with un-energized transmission lines, there is a field of prior art dealing with "live-line" work; specifically change-out or repair of transmission line insulators and hardware while the line continues to be energized. Live-line maintenance and repair takes advantage of a variety of tools and equipment, including personnel "buckets" which can be elevated to conductor level on insulated booms, in which case the bucket is caused to be at the same potential as the conductor or hardware, allowing maintenance personnel to safely put themselves in direct contact with the conductor or hardware. These techniques and equipment have also been used to adjust the sag of existing lines while they remain energized, as documented, for example, in the reference, R. C. Black and R. S. Throop, "*A Live Line Method for Retensioning Transmission Line Conductors*" *CIGRE paper* 22-10, 1970.

Only recently have means been proposed to replace the conductors over a long line section while a transmission line is still energized. US Patent application publication 20050133244 suggests doing so by putting in place a spare conductor, paralleling the power line, onto which power can be diverted while a formerly active conductor, no longer under high voltage, can be replaced. This method has the disadvantages of: (a) requiring the installation of temporary towers the full length of the line section being strung; and (b) still requiring safety precautions due to the voltage and current inductively coupled to new conductor as it is being strung.

Economic incentives for increasing the transmission capacity of existing power lines suggest that more efficient and more economical means be devised to replace energized conductors, particularly since the power lines for which the greatest incentive for conductor replacement exists are apt to be those which are hardest to remove from service for conductor replacement.

SUMMARY OF THE INVENTION

The invention comprises systems, methods, and equipment to allow an old or existing transmission line conductor to serve as the lead cable to draw a new or replacement conductor into place in its stead while, in one embodiment, both conductors and the line itself continue to carry full current under full voltage. In this embodiment the supply reel of new conductor and associated tensioner are insulated from ground and maintained at line potential, as is the take-up reel and associated puller.

The invention differs from prior art in that it describes equipment modifications, auxiliary equipment, and methods by which the old conductor can be cut, tied to the new conductor, and used as a lead cable to pull the new conductor into place. In the preferred embodiment, the invention may achieve the replacement while providing a continuous path for current to flow over the line section being replaced, thus causing no interruption of power flow. In another embodiment, the invention may achieve the replacement by restricting the power interruption to a very short duration.

For uninterrupted re-stringing, the transfer of current from one conductor to another, at both the tensioning and pulling ends of the operation, is achieved by causing the conductor to make one or more turns around a conducting wheel from which it receives current. The wheel, which rotates as the conductor is pulled, receives its current from a system of brushes tied, in turn, to the fixed conductor at either end of the re-conductoring section.

BRIEF DESCRIPTION OF THE DRAWINGS

Other objects, features and advantages will occur to those skilled in the art from the following description of the preferred embodiments of the invention, and the accompanying drawings, in which:

FIG. 28 illustrates a schematic of a current transfer wheel and brush assembly;

FIG. 32 illustrates an example embodiment of the device on one or more truck beds;

FIG. 33 illustrates an example of the insulated ramp to allow use of conventional tensioners and pullers adapted to use the invention;

FIG. 34 illustrates an example of the collapsible platform to support the tensioning and pulling equipment;

FIG. 35 illustrates an example of an access bucket to the energized platform;

FIG. 38 illustrates a system for detecting a stuck sheave.

DETAILED DESCRIPTION OF PREFERRED EMBODIMENTS OF THE INVENTION

The System

The following paragraphs describe a number of operations that may be conducted at line potential. None of these operations are believed to be outside the procedural and/or equipment capability of conventional "live-line maintenance" procedures. These procedures may be carried out from trucks with insulated booms, commonly used in transmission line maintenance and repair, or, in the case of operations in close proximity to the tower, by live-line tools designed for use from a grounded position.

Figure 1:
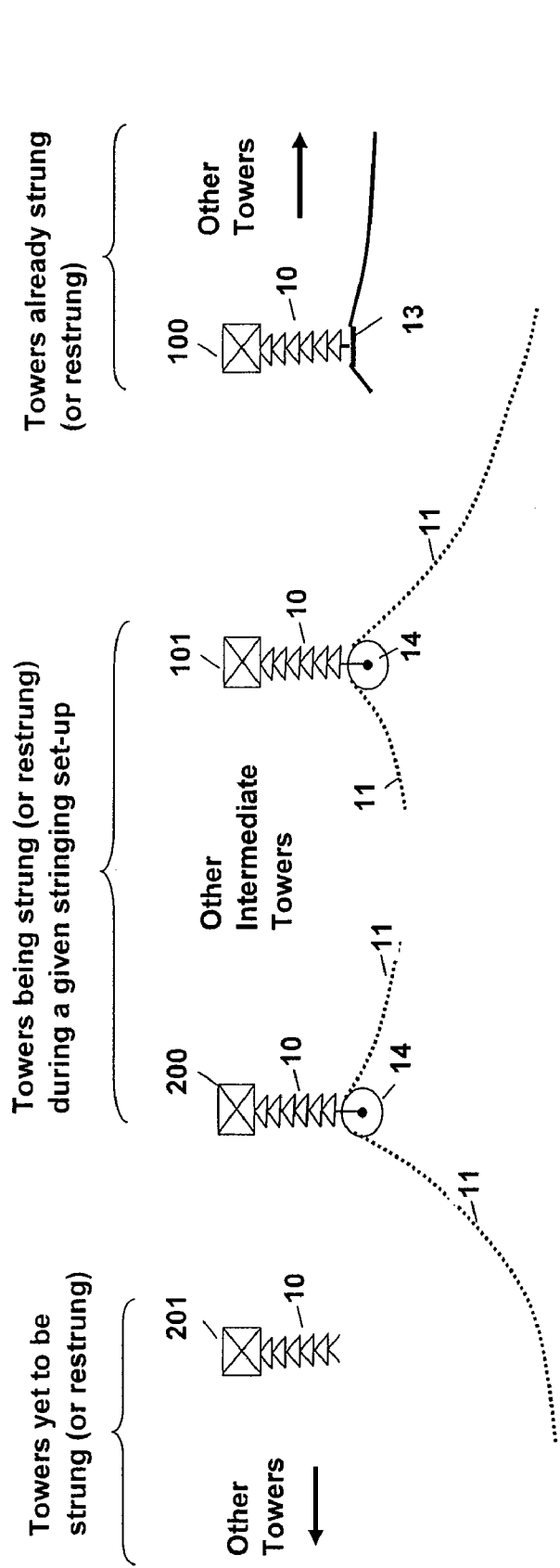
FIG. 1 illustrates a series of transmission line towers, some of which are to be strung or restrung.
Figure 2:
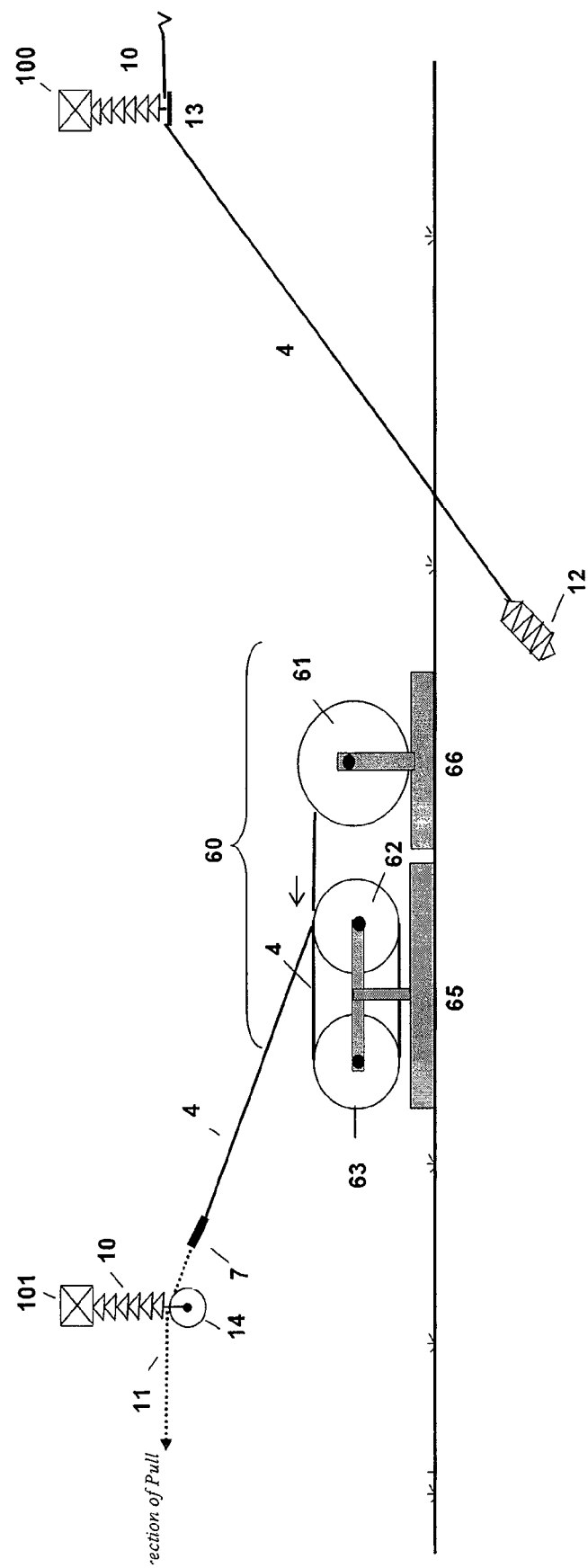
FIG. 2 illustrates the tensioning end of a prior art tension stringing operation.
Figure 3:
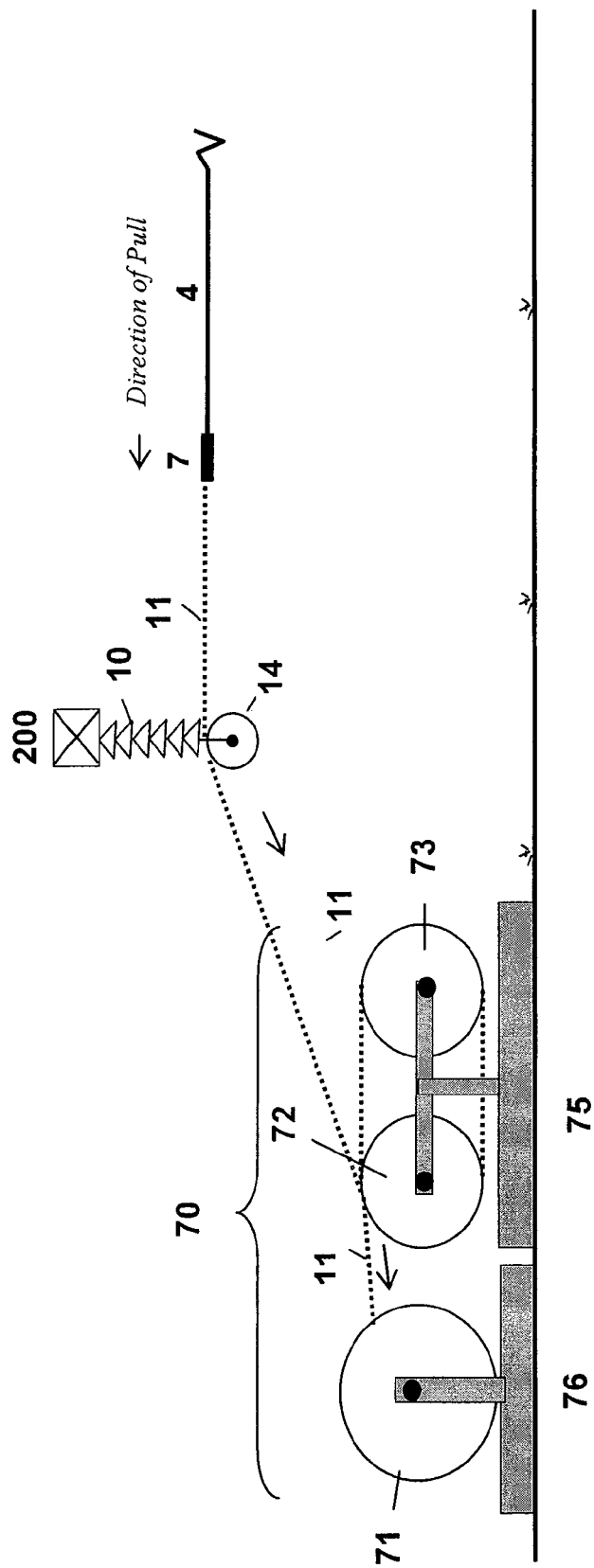
FIG. 3 illustrates the pulling end of the prior art tension stringing operation shown in FIG. 2.
Figure 4:
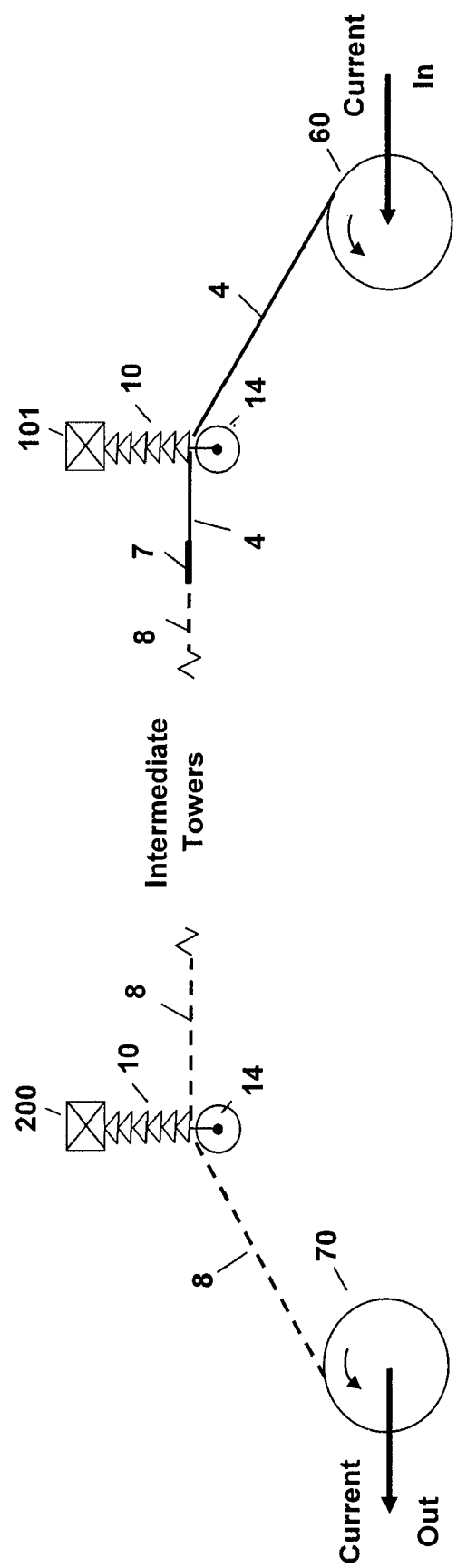
FIG. 4 illustrates an overview of the preferred embodiment of the invention.

FIG. 4 provides a simplified schematic diagram of the preferred embodiment of the invention, a system in which an old or existing high-voltage conductor is used to pull a new or replacement high-voltage conductor into place in its stead. FIG. 4 shows both the first tower 101 and the last tower 200 of the line section over which the previous conductor is to be replaced. Double sheave stringing blocks 14, have been attached to towers 101 and 200. Similar blocks with one sheave per conductor have been installed on intermediate towers. FIG. 4 also shows a tensioner or similar device 60 that is used to supply the new conductor 4, and a puller or similar device 70 that is used to take up the old conductor 8. New conductor 4 is attached to the old conductor 8 by the use of a coupler or similar device 7. Puller 70 is used to pull old conductor 8 which in turn pulls new conductor 4 into place through stringing blocks 14. The high-voltage line may remain energized during the replacement operation and current may continue to be carried as illustrated by the "Current In" and "Current Out" arrows.

The details of the preferred embodiment can best be understood by illustrating preparations for the connection of the tensioner and the puller assemblies and the conductor replacement operation. This will first be done for the pulling end (tower 200) and then the tensioning end (tower 101), though both may be undertaken simultaneously.

The Pulling End

Figure 5:
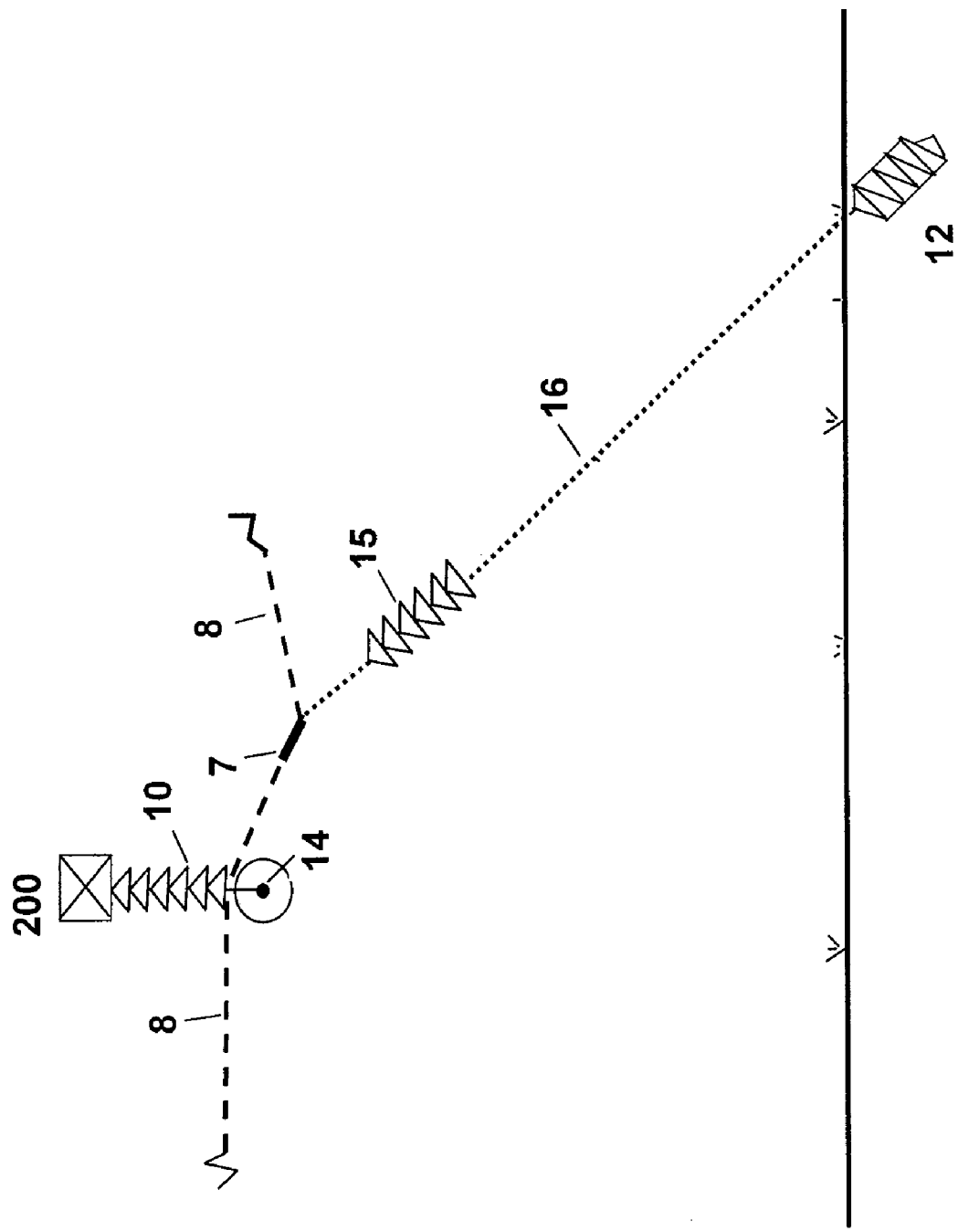
FIG. 5 illustrates Step 1 of the preparation at the pulling end for a live-line tension stringing operation, according to the preferred embodiment of the invention.

In FIG. 5 an auxiliary insulator 15, temporary guy 16, and temporary anchor 12 have been attached to the old conductor 8 by means of a coupler 7 and made to draw up tension using a prior art winch or come-along (not shown), pulling conductor 8 to the right and down through stringing block 14.

Figure 6:
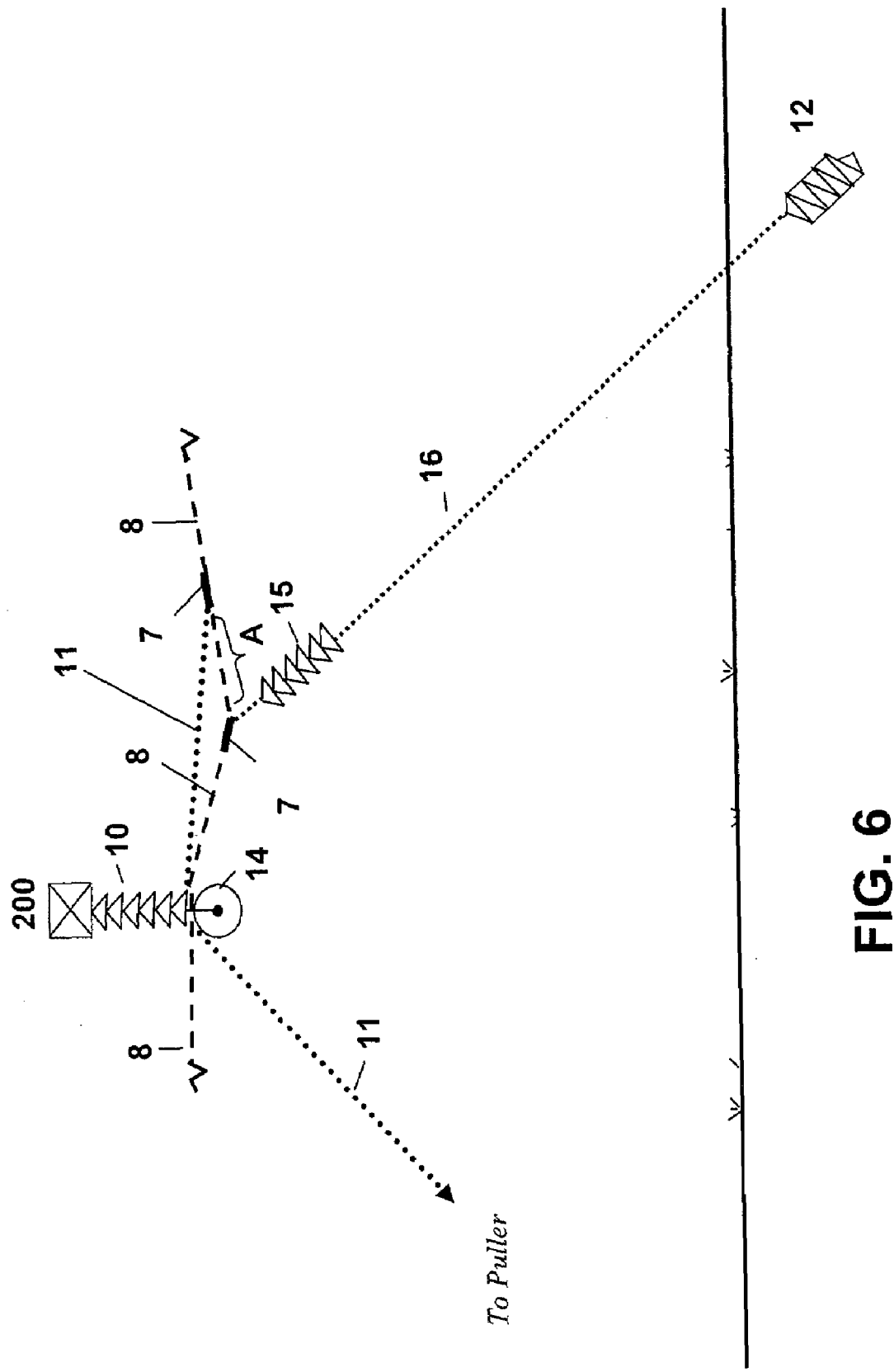
FIG. 6 illustrates Step 2 of the preparation at the pulling end for a live-line tension stringing operation, according to the preferred embodiment of the invention.

In FIG. 6 a lead cable 11 has been threaded through a second sheave on stringing block 14 and attached to the old conductor 8 somewhat to the right of the point at which the anchor assembly 15,16,12 are attached. The lead cable 11 in this case is capable of carrying full line current. The lead cable 11 in FIG. 6 has been pulled to take up slack.

Figure 7:
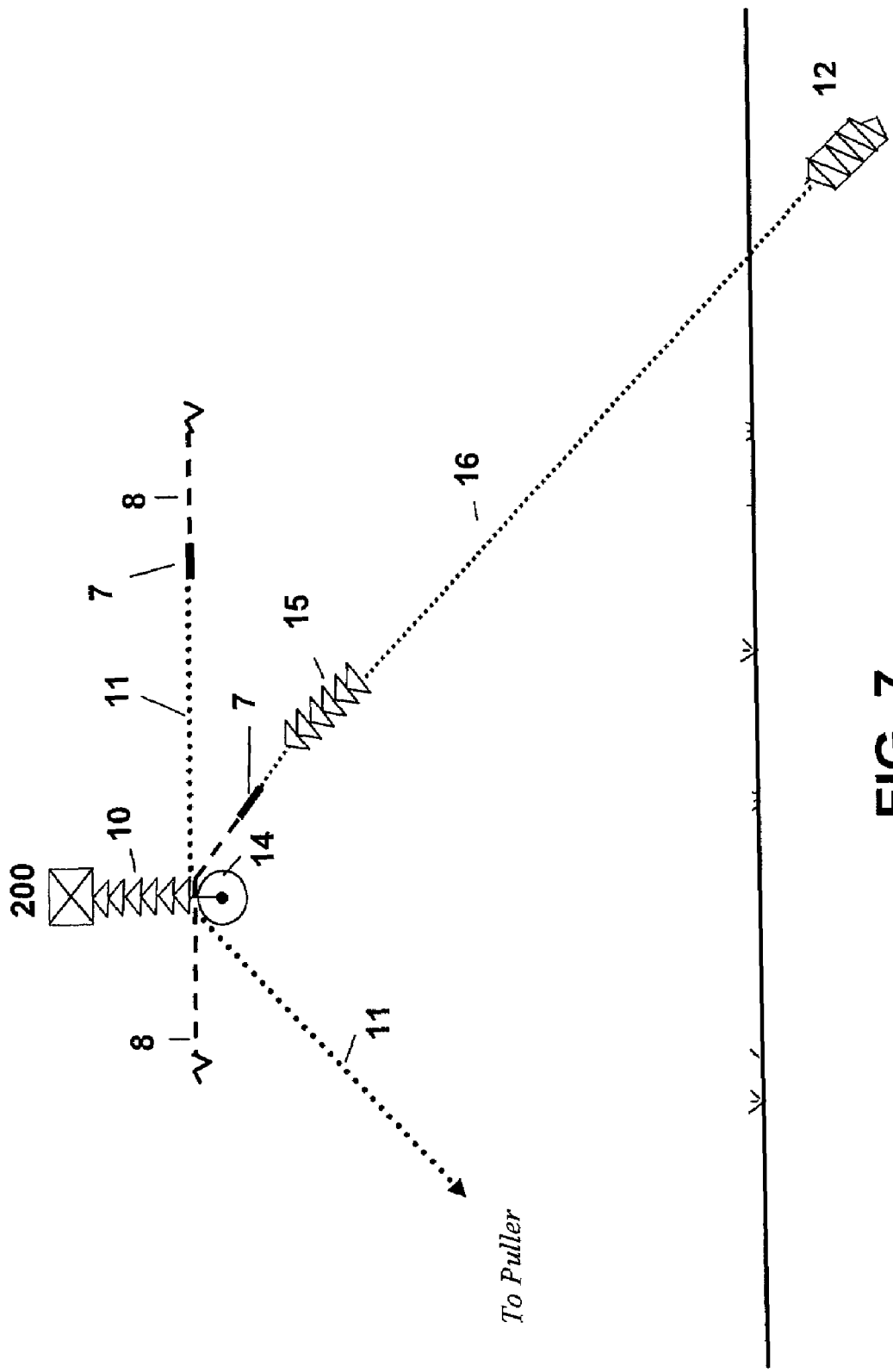
FIG. 7 illustrates Step 3 of the preparation at the pulling end for a live-line tension stringing operation, according to the preferred embodiment of the invention.

In FIG. 7 the section of old conductor indicated as A in FIG. 6 has been cut out of place, leaving the lead cable 11 carrying the full tension of the conductor to the right of tower 200. The anchor assembly 15, 16, 12 in turn is carrying the full tension of the conductor to the left of tower 200.

Figure 8:
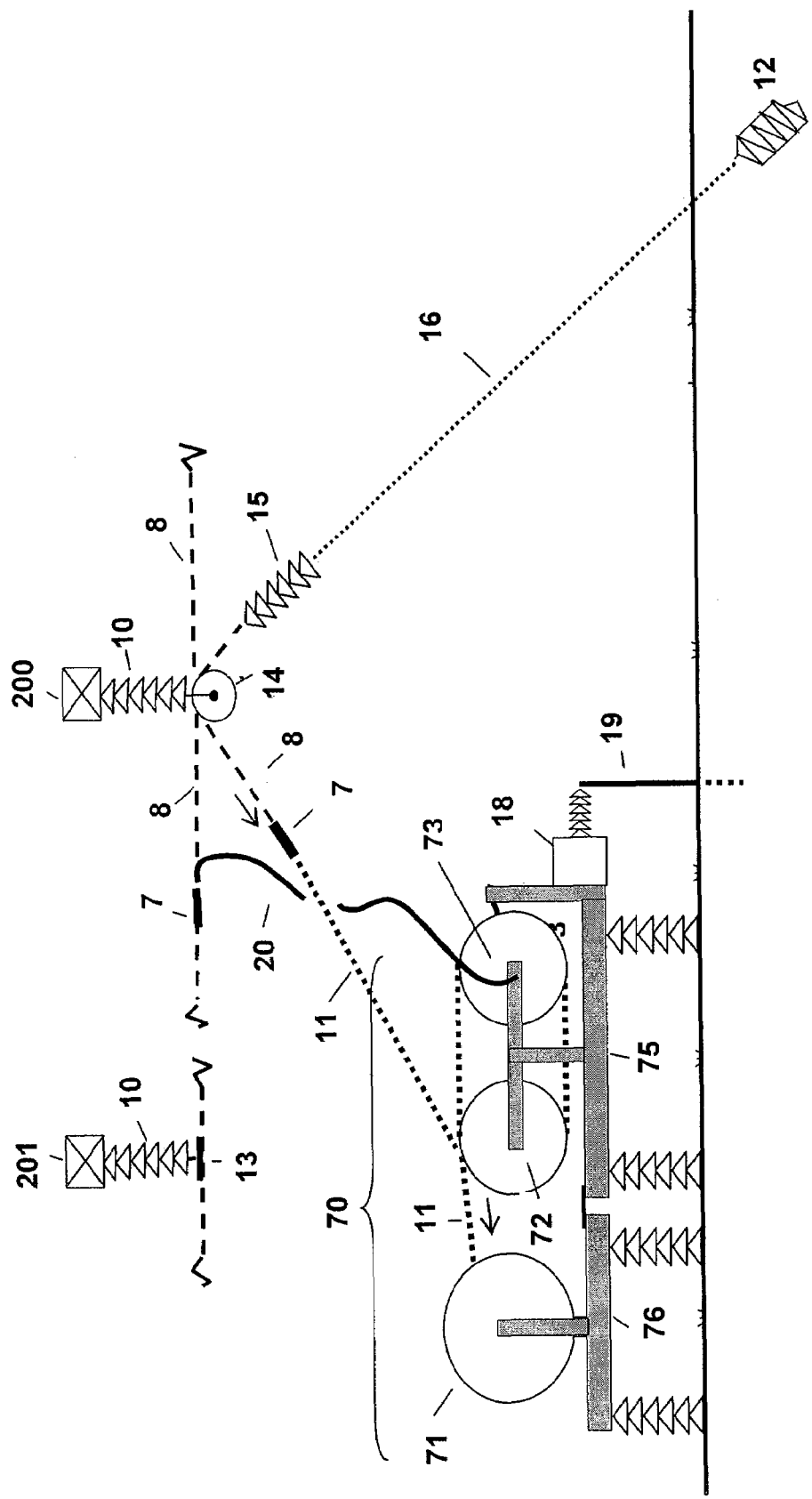
FIG. 8 illustrates an insulated puller in place, according to the preferred embodiment of the invention.
Figure 9:
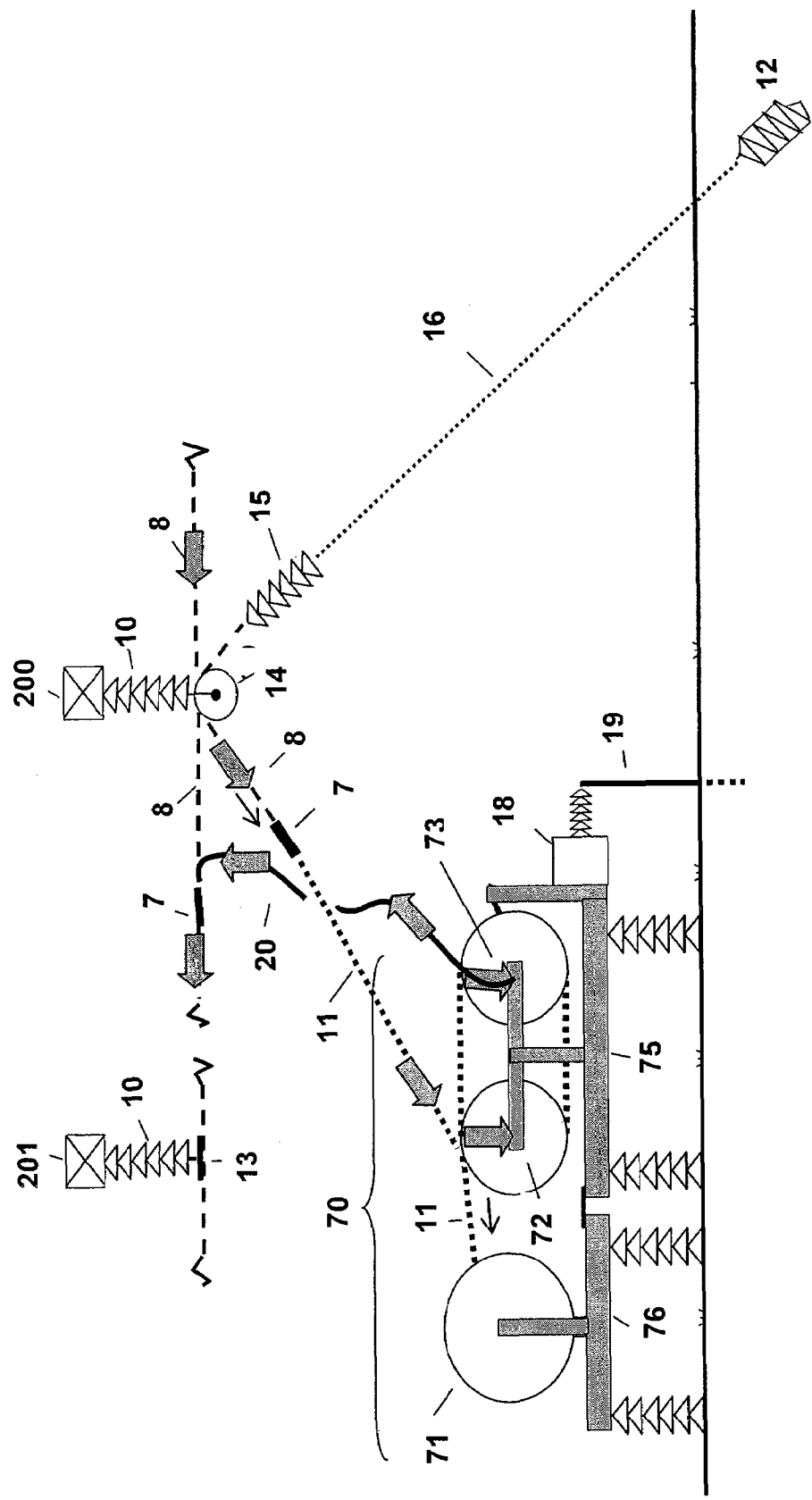
FIG. 9 illustrates the current flow through the insulated puller shown in FIG. 8.

FIG. 8 shows a schematic of the puller 70 which supplied the lead cable 11 in FIG. 6 and FIG. 7. Note that prior to the operations cited in those figures, a jumper lead 20 has been connected from the bull wheel 73 to the old conductor 8 by means of a coupler 7 immediately to the left of tower 200, thus providing a path for current from the old conductor 8 to the right of tower 200, through the lead cable 11, through a portion of the bull wheel 73 and to the old conductor 8 on the line section to the left of tower 200, not yet a part of the restringing operation. FIG. 9 shows that current path.

Figure 10:
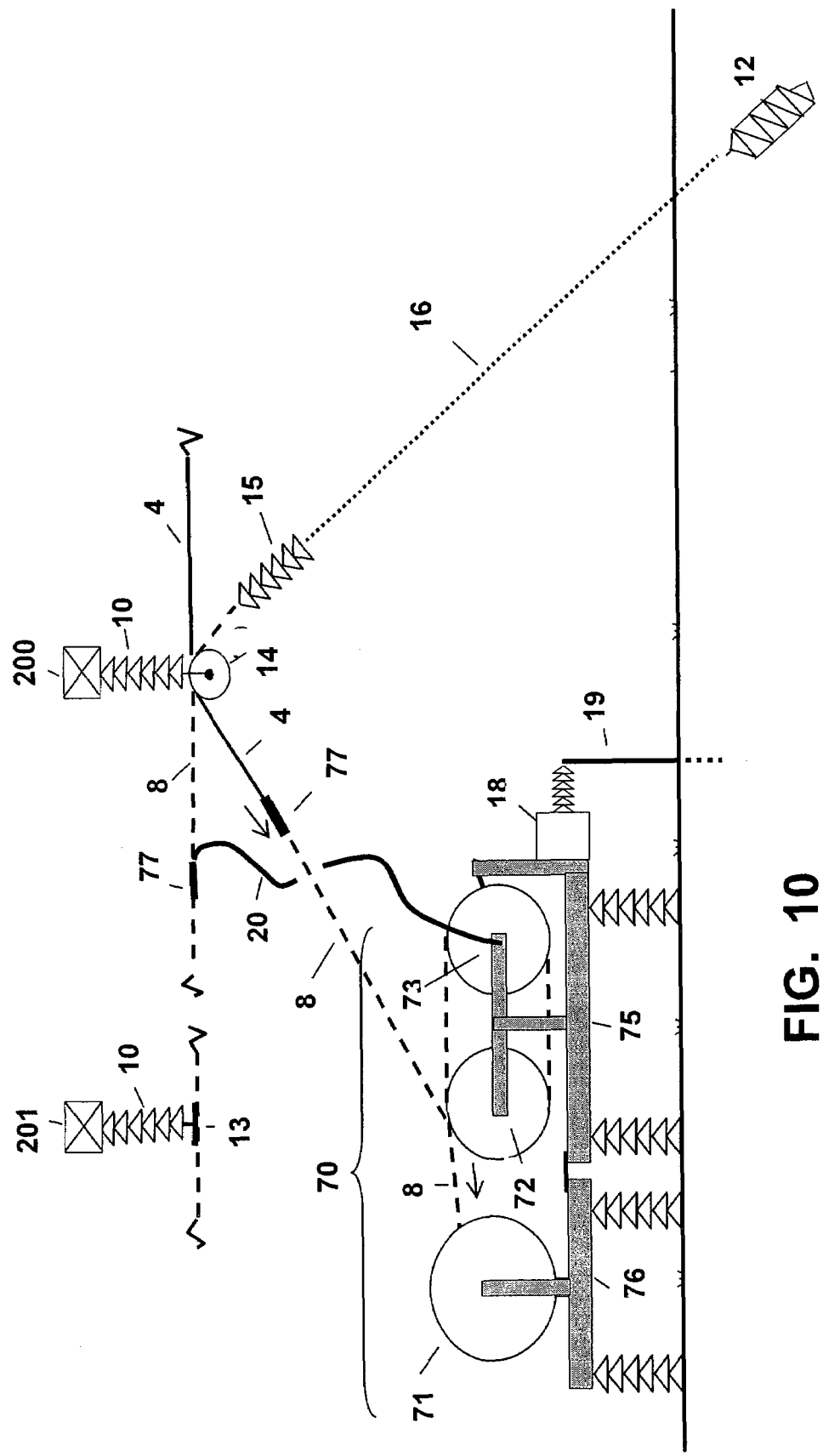
FIG. 10 illustrates an insulated puller near completion of the pull, according to the preferred embodiment of the invention.
Figure 11:
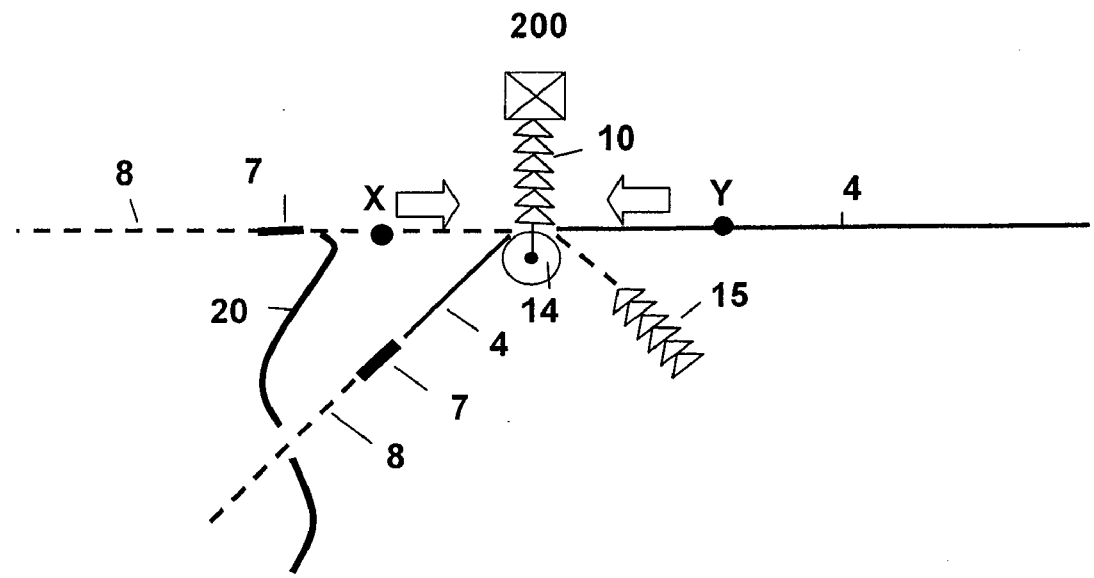
FIG. 11 illustrates Step 1 of a live-line puller disengagement, according to the preferred embodiment of the invention.

FIG. 10 shows the same configuration as in FIG. 8 and FIG. 9, but near the end of the pulling operation. The new conductor 4 has been pulled through stringing blocks 14 over the entire length of the pulling section from tower 101 to tower 200. The new conductor 4 must now be connected to the old conductor 8 to the left of tower 200 in order that the pulling equipment can be removed. FIGS. 11-15 illustrate an example means by which the old and new sections of conductor can be connected pending set up for a new pulling section. FIG. 11 shows a detail of the line connections of FIG. 10 but with two points, X and Y identified; points to which a tensioning device will be attached.

Figure 12:
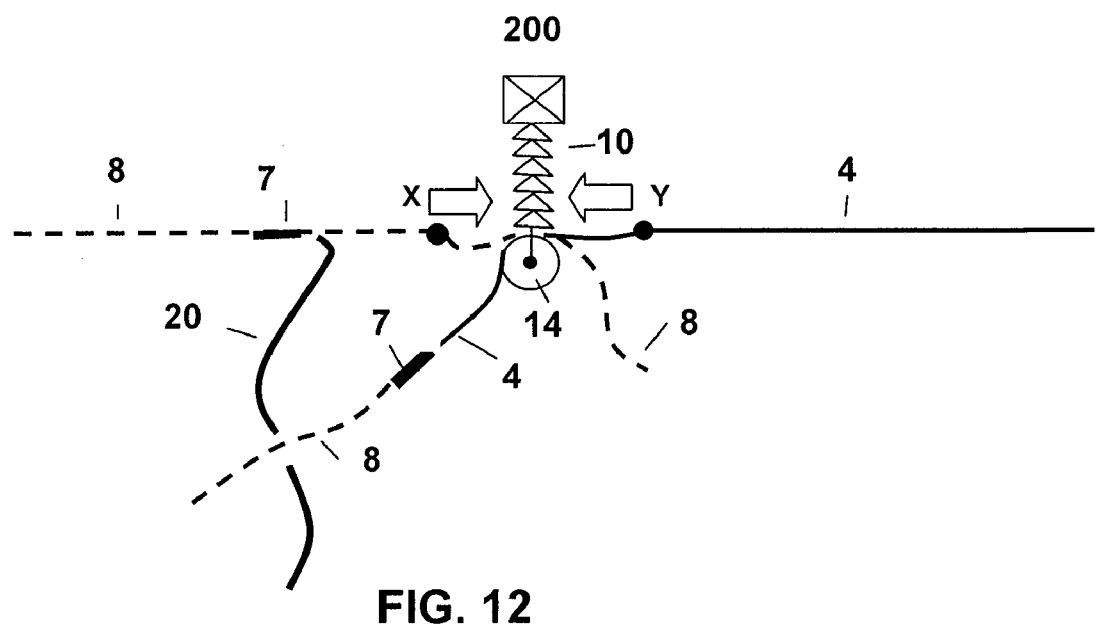
FIG. 12 illustrates Step 2 of a live-line puller disengagement, according to the preferred embodiment of the invention.

FIG. 12 presumes that a live-line tensioning device (prior art and not shown) has drawn points X and Y closer together, thus creating slack in that segment of old conductor 8 and the new conductor 4 which pass through double-sheave stringing block 14.

Figure 13:
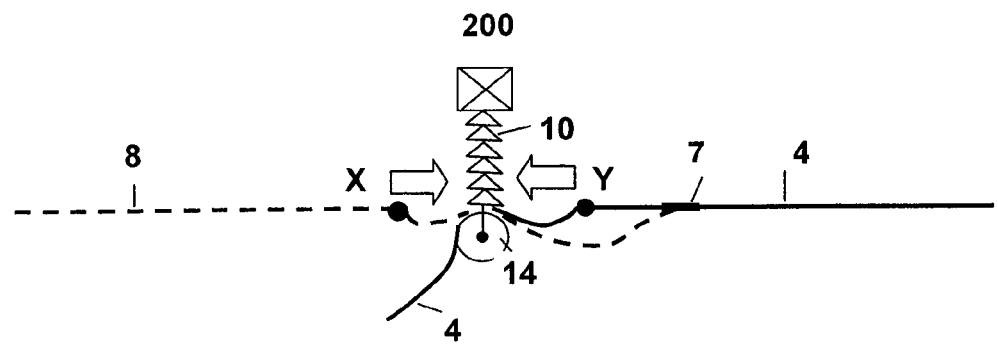
FIG. 13 illustrates Step 3 of a live-line puller disengagement, according to the preferred embodiment of the invention.

FIG. 13 shows that the slack segment of the old conductor 8, which was formerly tied to the auxiliary insulator 15, has been permanently clamped to new conductor 4 to the right of tower 200 by coupler 7, thus providing a direct path for current and allowing removal of the brush feed cable 20.

Figure 14:
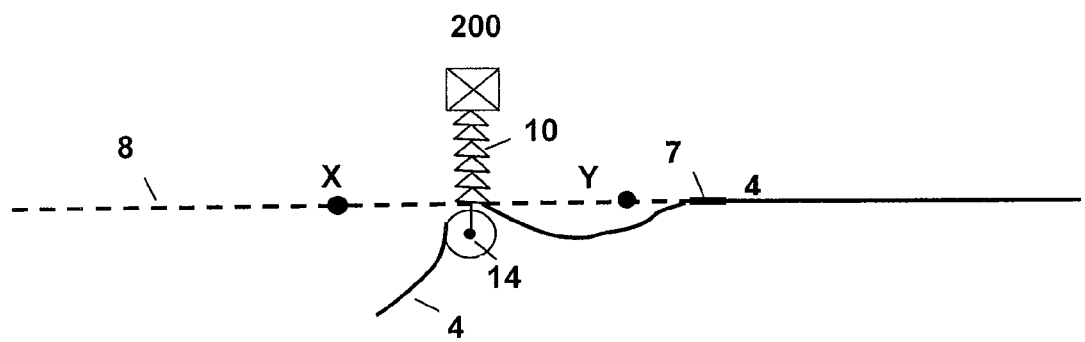
FIG. 14 illustrates Step 4 of a live-line puller disengagement, according to the preferred embodiment of the invention.
Figure 15:
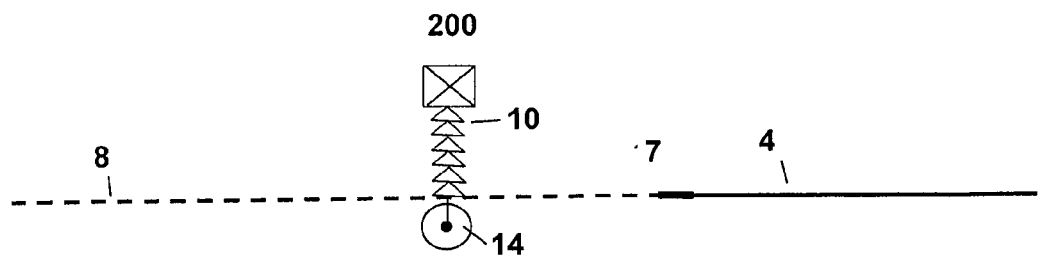
FIG. 15 illustrates the completion of a live-line puller disengagement, according to the preferred embodiment of the invention.

FIG. 14 shows the same condition but with the tensioning device relaxed and removed, leaving the left hand portion of the new conductor 4 slack and, in FIG. 15, removed. This leaves the section of line to the left of tower 200 ready for restringing in the same manner.

The Tensioning End

Figure 16:
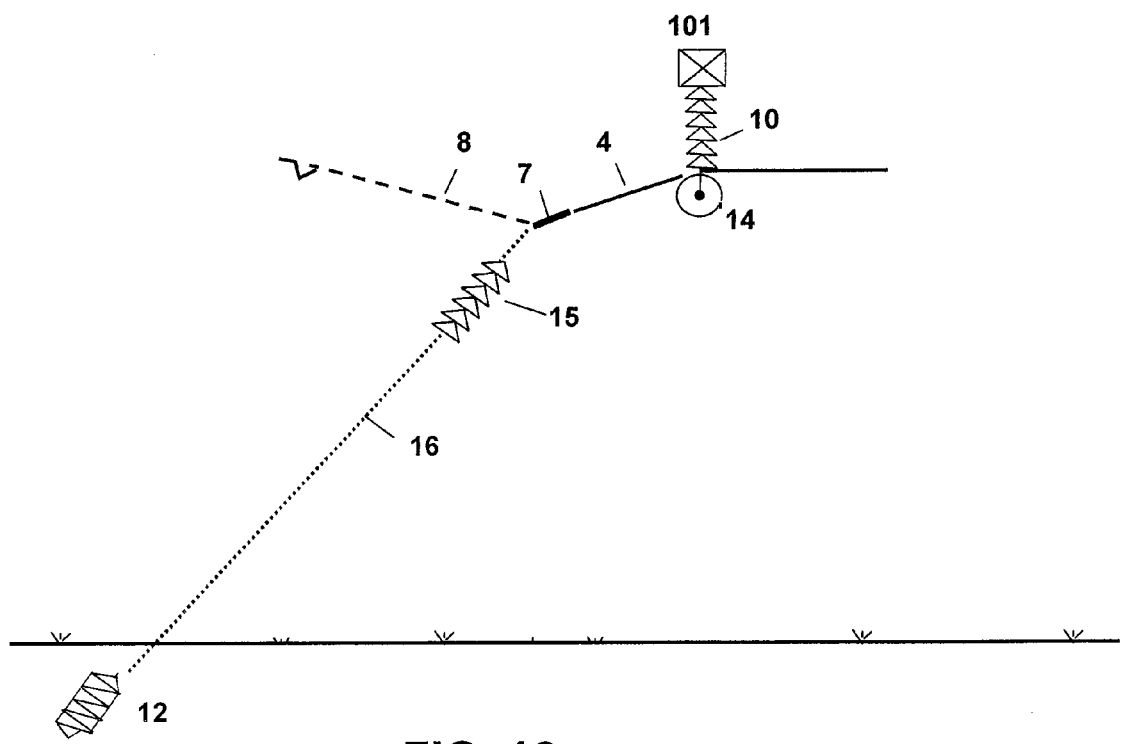
FIG. 16 illustrates Step 1 of the preparation at the tensioning (supply) end for a live-line tension stringing operation, according to the preferred embodiment of the invention.
Figure 17:
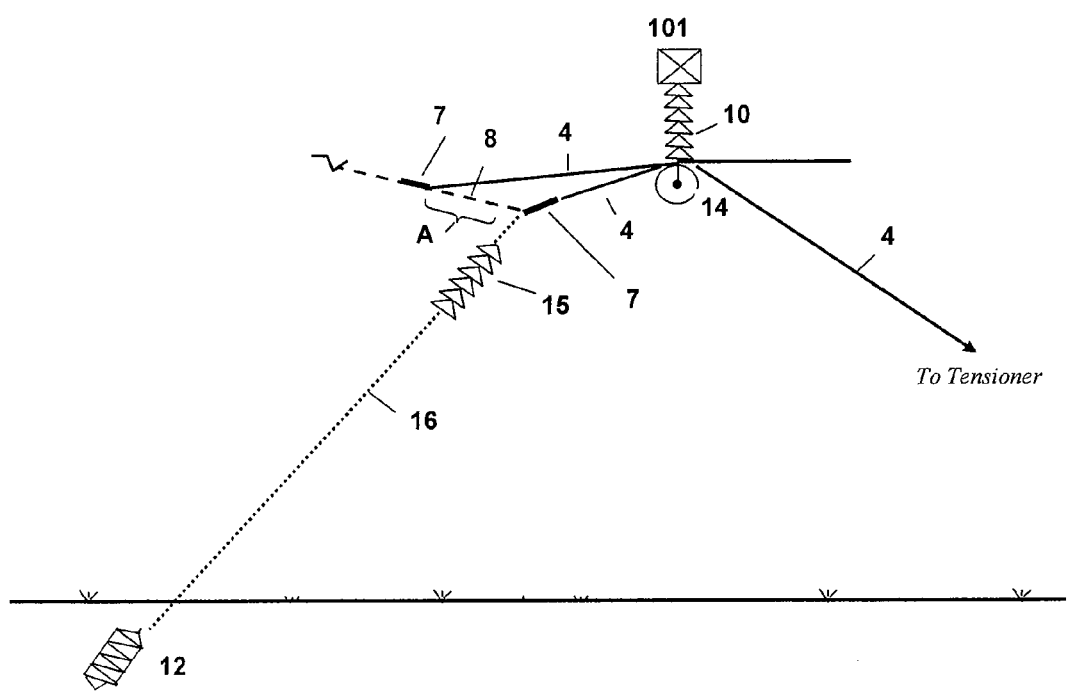
FIG. 17 illustrates Step 2 of the preparation at the tensioning (supply) end for a live-line tension stringing operation, according to the preferred embodiment of the invention.

The foregoing paragraphs illustrated an embodiment of the invention from the pulling end, i.e. tower 200. A similar procedure may be used at the tensioning end, i.e. at the first tower in the pulling section, tower 101. FIG. 16 shows the initial preparation corresponding to that of FIG. 5 for the pulling end. It presumes that new conductor 4 has already been installed on towers 100 and all those to the right of tower 100. Once again the temporary guy assembly 15, 16, 12 is made to pull the conductor 4 to the left and downward through the stringing block 14 by means of a prior art winch or come-along. In FIG. 17 the end of a new reel of new conductor 4 has been fed from right to left through the stringing block 14 and attached to the old conductor 8 by means of a coupler 7 to the left of the point of attachment of the temporary guy assembly 15, 16, 17.

Figure 18:
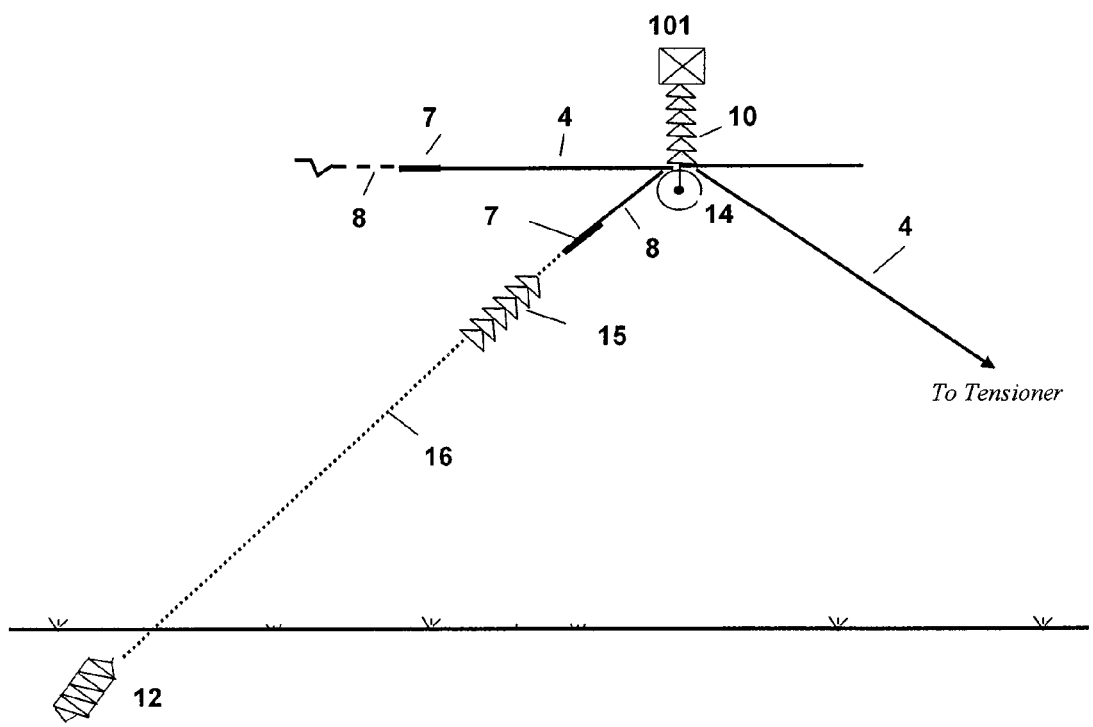
FIG. 18 Illustrates Step 3 of the preparation at the tensioning (supply) end for a live-line tension stringing operation, according to the preferred embodiment of the invention.
Figure 19:
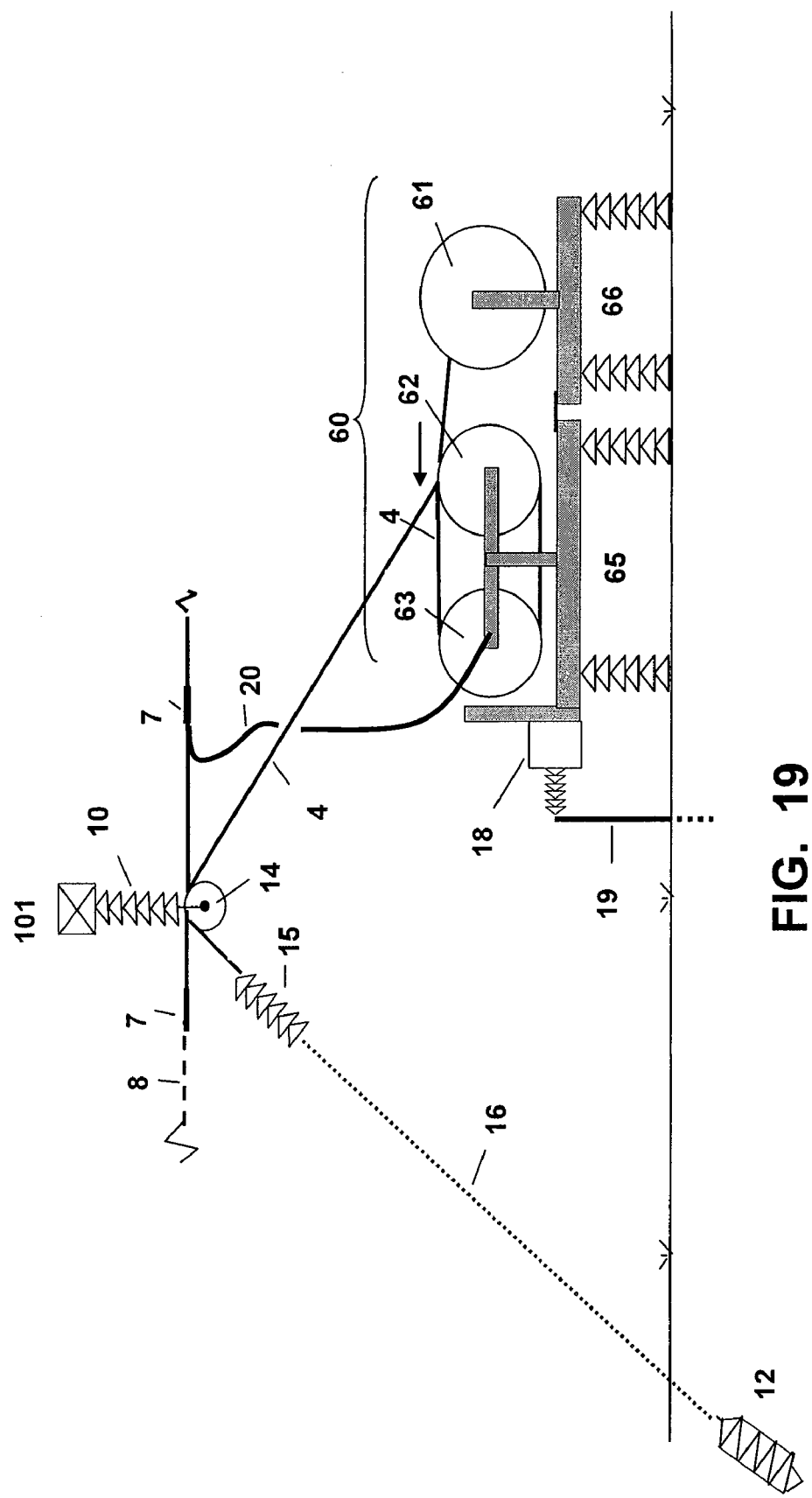
FIG. 19 illustrates an insulated tensioner in place, commencing the live-line pull, according to the preferred embodiment of the invention.
Figure 20:
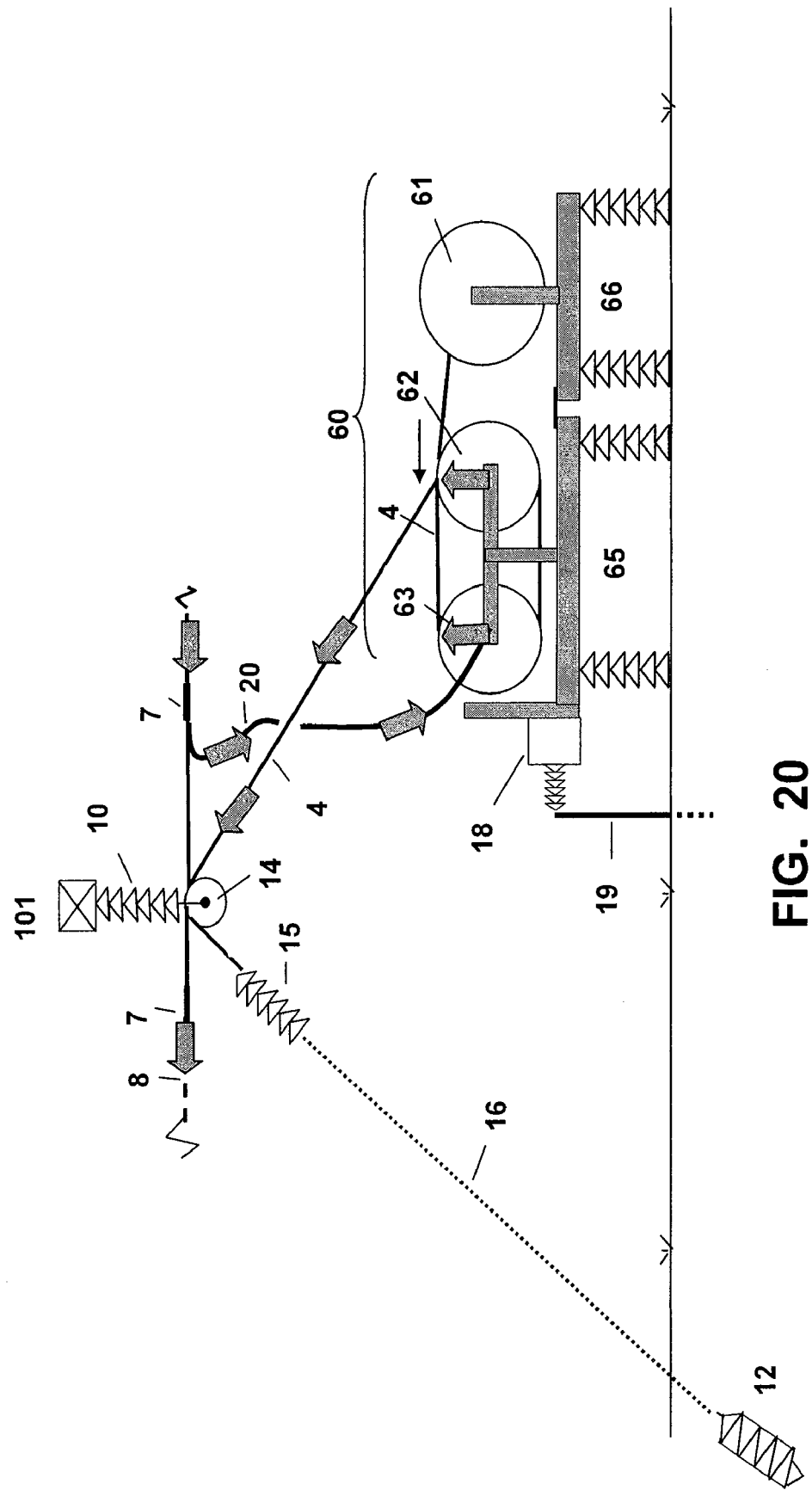
FIG. 20 illustrates the current flow through the insulated tensioner shown in FIG. 19.

In FIG. 18 the section of old conductor 8 designated as A in FIG. 17 has been cut away leaving the section of new conductor 4 to the left of tower 101, the section already restrung, supported in tension solely by the temporary guy assembly 15, 16, 12, and the section to the left of tower 101, the section to be restrung, supported in tension solely by the tensioner 60 a more detailed illustration of which is given in FIG. 19. As the puller, described in previous paragraphs, pulls the old conductor through stringing blocks over the line section, defined here by towers 101 to 200, a reel of new conductor 61, being attached to the old conductor 8 by coupler 7, is fed onto that line section. As in prior art conventional tension stringing, the tensioner maintains sufficient tension during the pulling operation to prevent the conductor from sagging to unsafe levels while the restringing is taking place. FIG. 20 illustrates the path of current during the operation cited above.

Once the conductor has been pulled over the entire length of the pulling section; i.e. from tower 101 to tower 200, tying off procedures identical to those illustrated in FIGS. 11-15 for the pulling end can be used at the tensioning end. In this case the coupler 7 may differ in design since it will be a permanent part of the restrung line.

Insulated Pulling and Tensioning Equipment

FIGS. 19 and 20 show that, in one embodiment of this invention the supply reel 61, and bull wheels 62 and 63, of tensioner 60, and all associated motors, brakes, and auxiliary equipment, may be at full line voltage. They are shown mounted here on insulated platforms 65 and 66, which are described later. Attached to platforms 65 and 66, which may be combined as one, is rapid grounding switch 18 that in turn is connected to ground via ground connector 19. Rapid grounding switch 18 may be operated by a line tension sensor (not shown) so as to immediately short-circuit the conductor and cause the line be tripped out of service by circuit breakers (not shown) at either end in the event that the tension drop indicates loss of control of conductor clearance to ground. These breakers will operate in less than one half second, before a broken conductor would hit the ground, thus protecting both the stringing crew and the general public from high voltage contact.

FIGS. 8,9 and 10 shows that the take-up reel 71, and bull wheels 72 and 73, of puller 70, and all associated motors, brakes and auxiliary equipment, may also be at full line voltage. They are shown here mounted on insulated platforms 75 and 76, which are described later. As with the tensioner discussed above, a rapid grounding switch 18 is attached to platforms 75 and 76, which may be combined as one, to ground by ground connector 19. For the sake of personnel safety both the tensioning and pulling platforms 60 and 70 and all associated equipment may be surrounded by a metallic fence mounted on a high-conductivity ground mat, well connected to ground. Other safety issues are described in later paragraphs.

Current Transfer Methods

Figure 21:
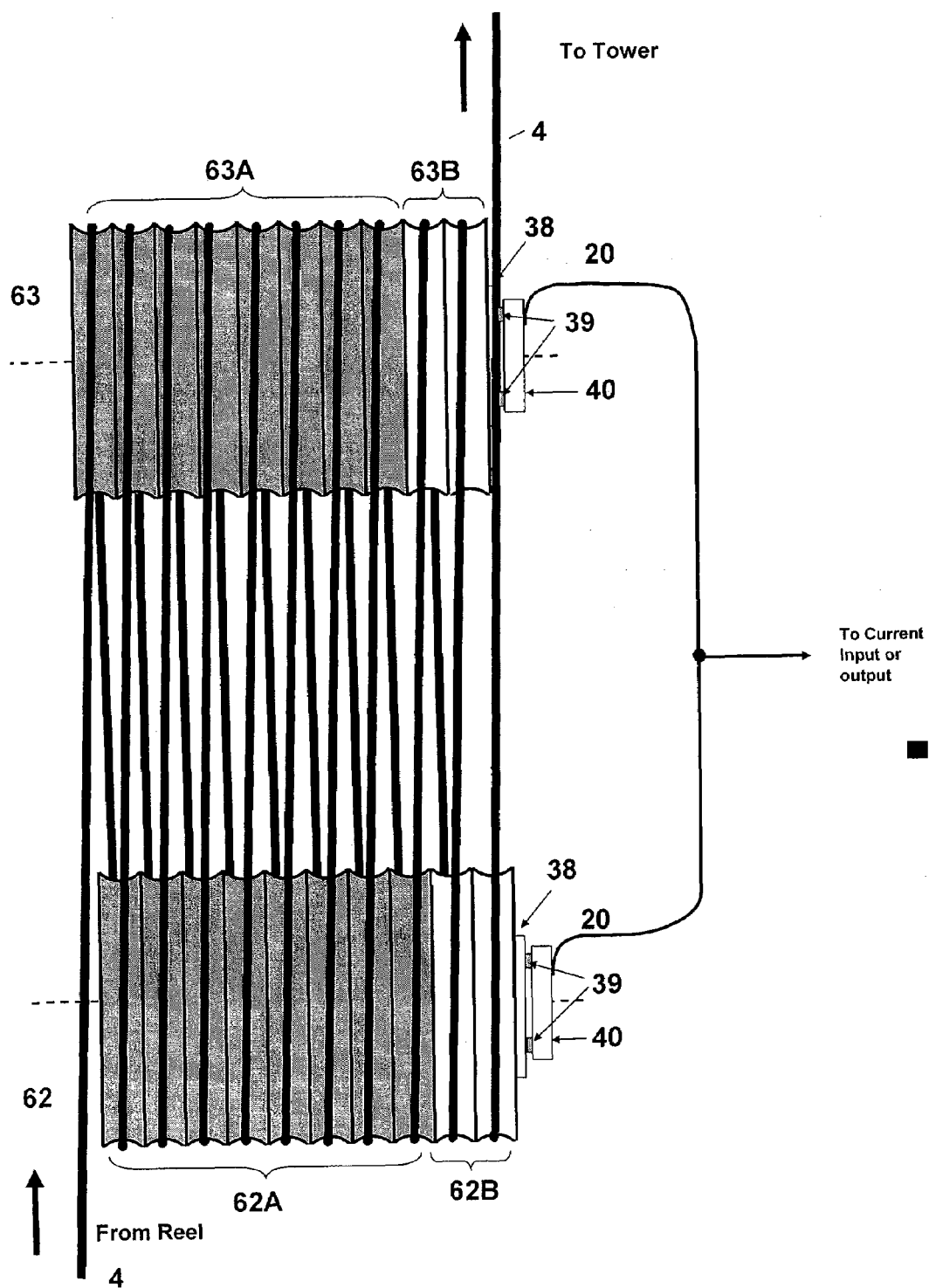
FIG. 21 illustrates a portion of bull wheels dedicated to current transfer.

FIG. 21 shows an embodiment of the invention in the form of specially designed bull wheels of the general form used in the tensioner 60 shown in FIG. 19 (bull wheels 62 and 63) and in the puller 70 shown in FIG. 8 (bull wheels 72 and 73). While only bull wheels 62 and 63 are shown in FIG. 21, the following discussion is similarly applicable to bull wheels 72 and 73.

There are two sections to each bull wheel: a friction section and a conducting section. The friction section of bull wheels 62 and 63 (labeled 62a and 63a), is dedicated to maintaining friction for tensioning. The conducting section of bull wheels 62 and 63 (labeled 62b and 63b), is dedicated to gaining good electrical contact between new conductor 4 and bull wheels 62 and 63.

Grooves in the friction section may typically be lined with plastic material to improve friction and prevent mechanical wear of the wheels. Grooves in the conducting section may typically be lined with a conducting liner. The conducting section 62b and 63b of bull wheels 62 and 63 may be made with a slightly larger diameter to provide a degree of "wiping" action to enhance contact. The liner in the conducting sections may typically see considerable wear and should be designed for convenient periodic replacement.

FIG. 21 further illustrates a brush system. In FIG. 21, there are two rotating brush plates 38, one coupled to each of the upper and lower bull wheels 62 and 63. Rotating brush plates 38 mechanically and electrically connect to conducting section 62b and 63b of bull wheels 62 and 63. A number of brushes 39 are pressed against rotating brush plate 38 by springs (not shown) and serve to transfer current from fixed brush holder assembly 40 which, in turn, is connected by jumper leads 20 to the source of current supplied to the conductor. The number, size, and properties of brushes 39 should be selected to assure acceptable current density at the point of brush contact with the rotating brush plate 38. All components of the brush system described in this paragraph are in common application.

The number of grooves devoted to electrical contact and the diameter of the bull wheels themselves must be selected to assure acceptable current density at the conductor surface.

It is clear that use of the invention described herein should be limited to periods where there is no risk of lightning strokes. That precaution notwithstanding, the system should be capable of surviving a transmission line short-circuit, either unanticipated or deliberate in the case of loss of tension, without damage to the conductor or to the stringing equipment. Short circuit current can be temporarily limited by inserting a reactor in series with the phase being re-conductored at the feeding substations. Additionally, a bypass may be installed as shown in FIGS. 22 through 24 as a precaution against damage to the brush system due to short circuit currents.

Figure 22:
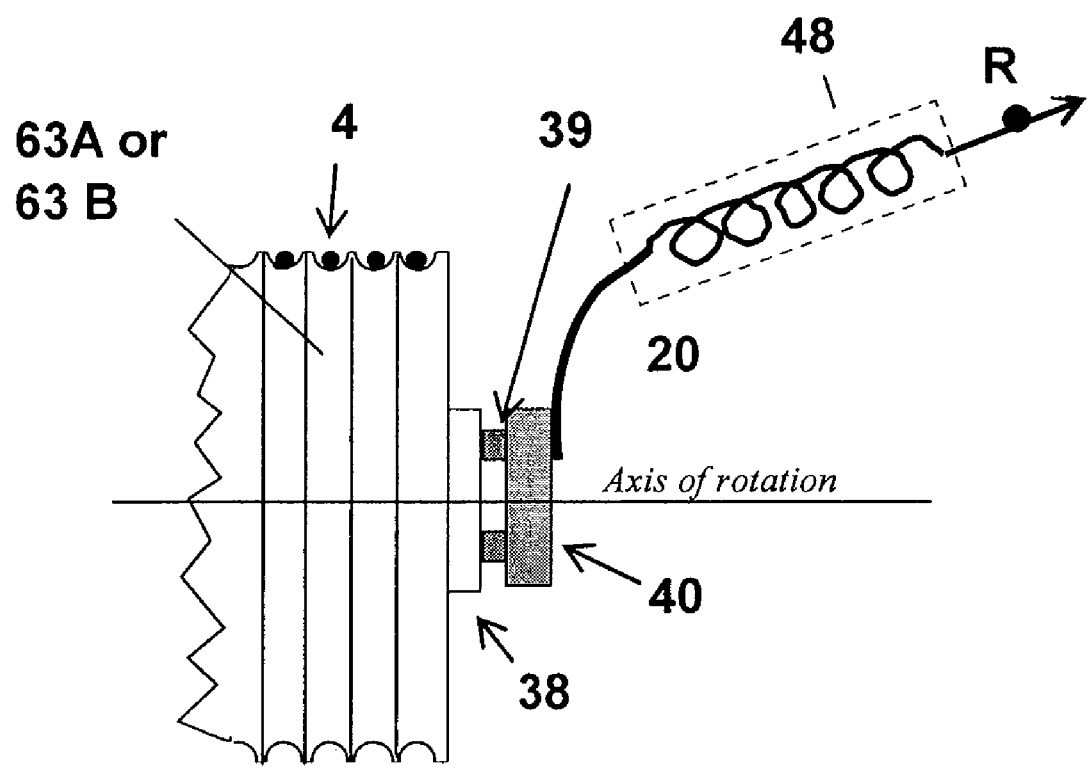
FIG. 22 illustrates the auxiliary reactor connection for over-current protection.
Figure 23:
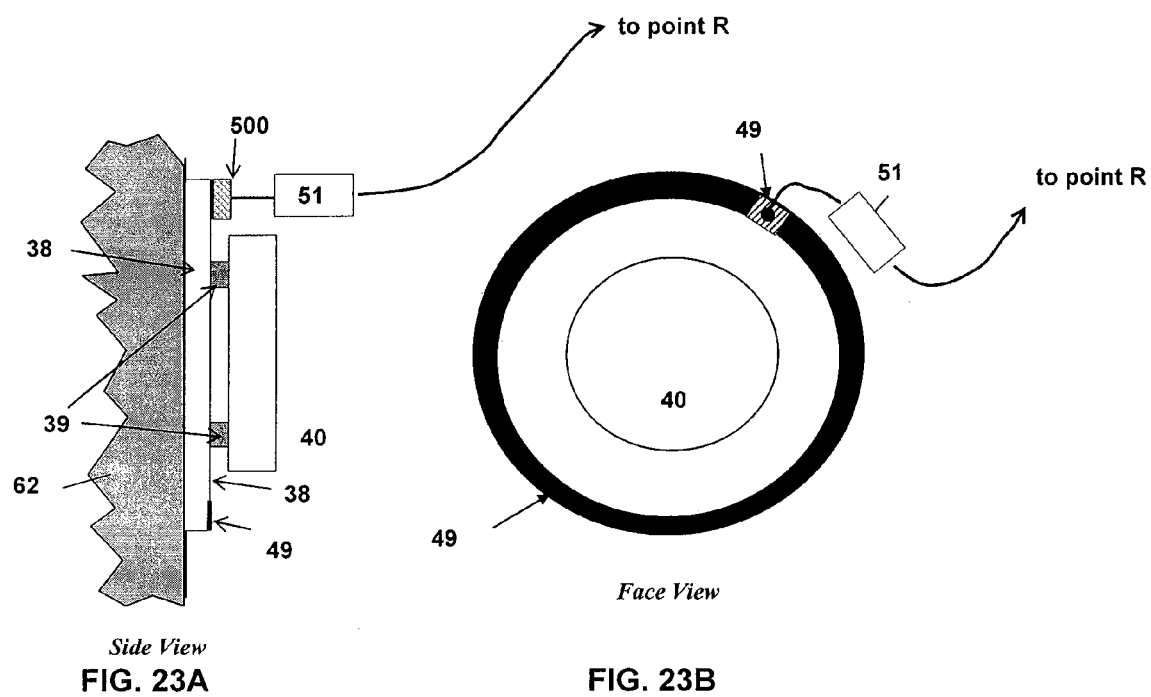
FIG. 23 illustrates the bypass contactor and protective gap for over-current protection.

In FIG. 22, an auxiliary reactor 48 is shown in series with the jumper lead 20, the remote end of which is identified as point R. FIGS. 23A and 23B show a short circuit current bypass system consisting of a high conductivity flat bypass contact disc 49, mechanically and electrically bonded to the outside edge of the conducting portion of bull wheels, 62a and 62b in FIG. 21. In close mechanical contact with bypass contact disc 49 is a roller or metallic brush 500 which need not be designed to carry current under normal conditions since the gap or surge arrester 51 will normally be equivalent to an open circuit. In the event the line is subject to a high short circuit current, the voltage drop caused by that current as it flows through the reactor 48 and the brushes 39 will cause the gap or surge arrester 51 to flash over, thus diverting the current from the brush/brush plate 39/38 path.

Figure 24:
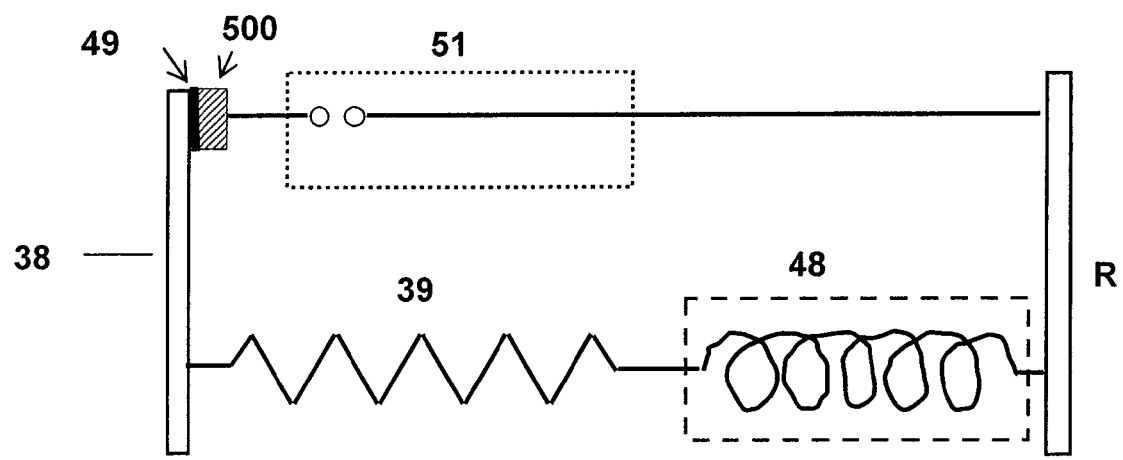
FIG. 24 illustrates an electrical equivalent of over-current protection scheme.

FIG. 24 shows an electrical equivalence diagram where the combined voltage drop across the brushes 39 and auxiliary reactor 48 causes the gap or surge arrester 51 to flash over, thus diverting short circuit current from the brush assembly.

Figure 25:
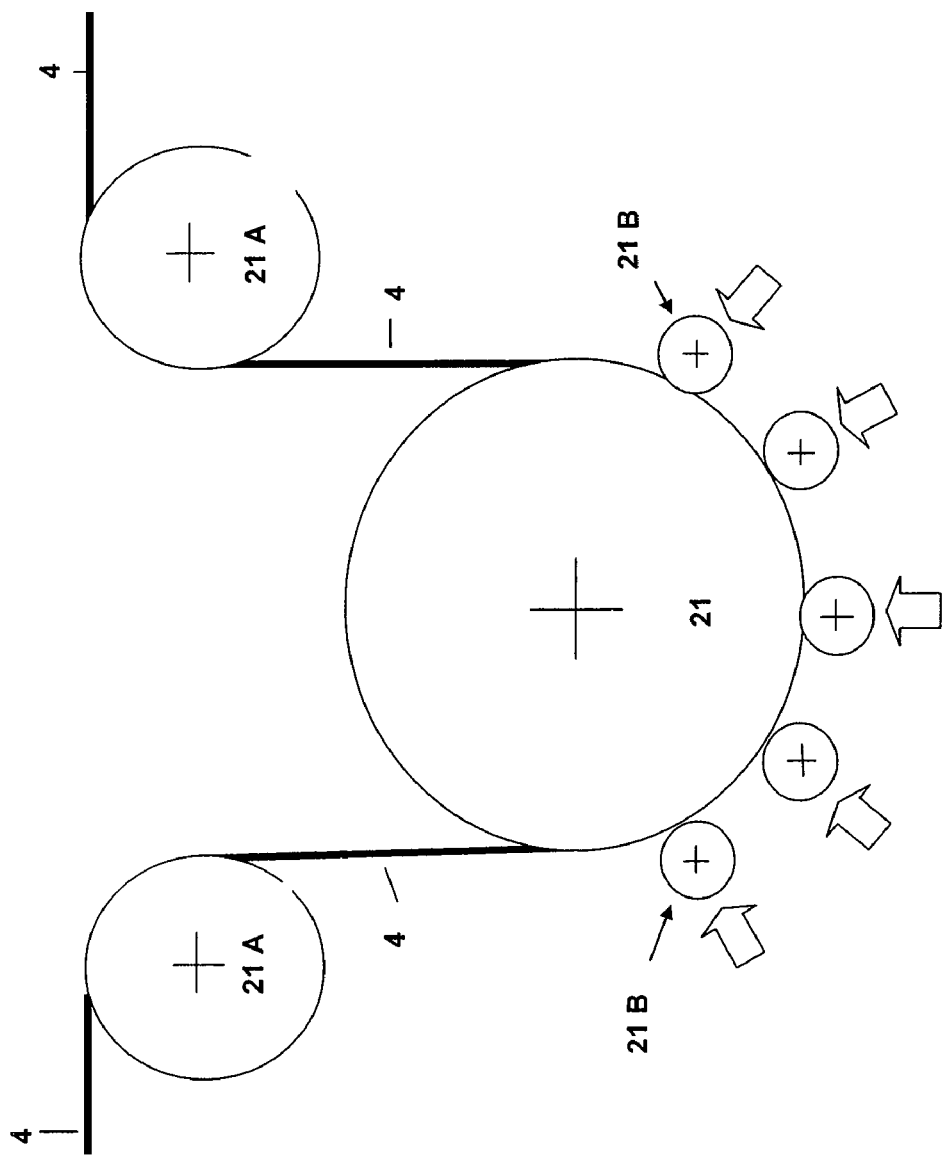
FIG. 25 illustrates an alternative embodiment of the invention with a dedicated contactor wheel and pressure wheels.

Another example embodiment of the invention is shown in FIG. 25 where an assembly consisting, in part, of a single contactor wheel 21, separate and distinct from a bull wheel assembly, is used for transferring electrical current from or to a conductor. The assembly shown in FIG. 25 would be installed between the point of departure of a conductor from a standard puller and tensioner and the point of entry or departure of the conductor to its overhead position allowing standard bull wheel configurations to be used for either pulling or tensioning. In this example embodiment the conductor 4 is caused to pass over a major portion of the contactor wheel 21 by directioning idler wheels 21A. The contactor wheel 21 groove may be equipped with a high conductivity metallic liner. In this example however, the conductor 4 is forced into a tight metallic contact with the contactor wheel 21 by pressure wheels 21B, thus establishing good contact independent of the tension on the conductor itself. Arrows indicate the direction of pressure. The pressure wheels 21 B are fixed to the same framework as the contactor wheel 21 and held against it by appropriate spring mechanisms (not shown).

Figure 26:
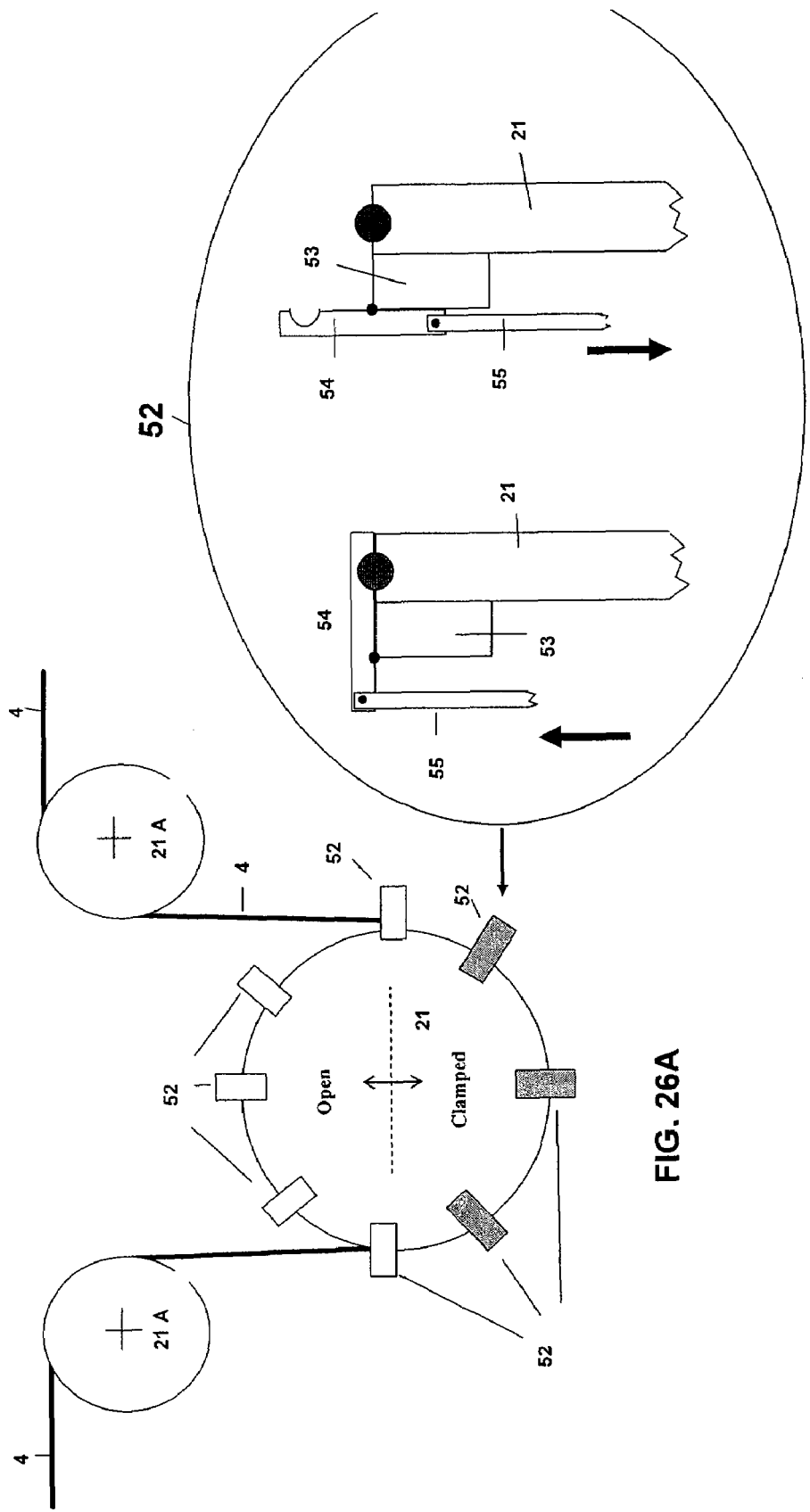
FIG. 26 illustrates an alternative embodiment of the invention with a dedicated contactor wheel and wheel-mounted clamps.

FIGS. 26A and 26B show still another possible embodiment in which a series of clamps 52 are mounted on the contactor wheel 21, mechanically and electrically clamping the conductor 4 to the contactor wheel 21 but releasing prior to the entry or departure point of the conductor from the contactor wheel 21. FIG. 26B shows one possible clamp device 52 where pressure on operating arm 55 forces the upper clamp face 54, free to pivot about its mounting frame 53 which is directly attached to the contactor wheel 21, against the conductor 4 or, when subject to tension, lifts the clamp face 54 off the conductor 4 and out of the way. The operating arm 55 may be caused to push or pull the clamp face 54 by any number of mechanical linkages that sense the position of rotation of the contactor wheel 21.

Another embodiment, shown in FIGS. 27A, 27B and 27C, uses the conductor tension as a means of assuring good contact between the conductor and a contactor wheel 21 completely separate from standard pulling and tensioning equipment and, in this example, mounted on a separate platform useable both pulling and later tensioning functions without the need for relocation of equipment for the two purposes. It may also serve from that location each phase position of a three-phase transmission line.

This embodiment shows a separate contactor wheel 21 rotating about an axle that is mounted on a frame 22, that frame 22 resting on a working platform 25 that, in turn, is mounted on a second frame 23 by means of suitable insulators. In this case the contactor wheel 21 is neither driven nor braked and serves only to transfer current from a clamp 24, the function of which is explained later, through a jumper lead 20, to a brush assembly 17 to the contactor wheel 21 and by way of that wheel 21 to whatever conductor is wrapped around it.

Figure 27:
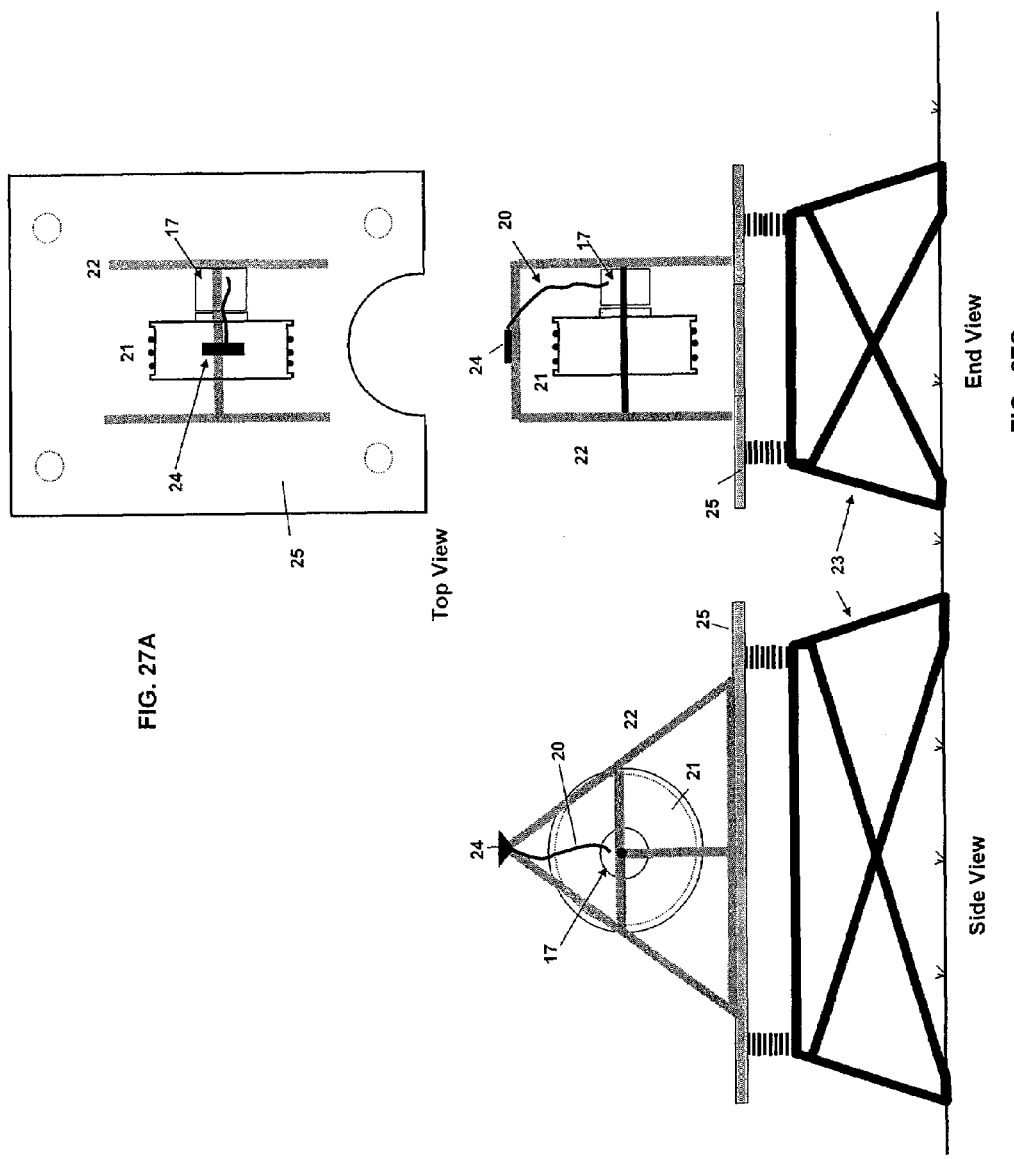
FIG. 27 illustrates an example mid-span current transfer device embodiment of the invention.

FIGS. 28A and 28B show the contactor wheel 21 assembly of FIGS. 27A, 27B, and 27C in somewhat more detail and with the same current transfer scheme cited previously. The contactor wheel 21 with a soft metal surface or liner should have a sufficient length of conductor-to-wheel contact area to transfer current between the two members without generating excess heat. In FIGS. 28A and 28B, a conductive brush contact plate 38, mounted on and rotating with the contacting wheel 21 and well connected to the surface against which the conductor turns 4 are pressed. A series of brushes 39 are caused to press against the brush contact plate 38 by conventional brush support assemblies, the brushes 39 being supported by and electrically fed by a stationary assembly 40 which, in turn, is connected to either the incoming or outgoing line conductor as shown in previous figures.

Figure 29:
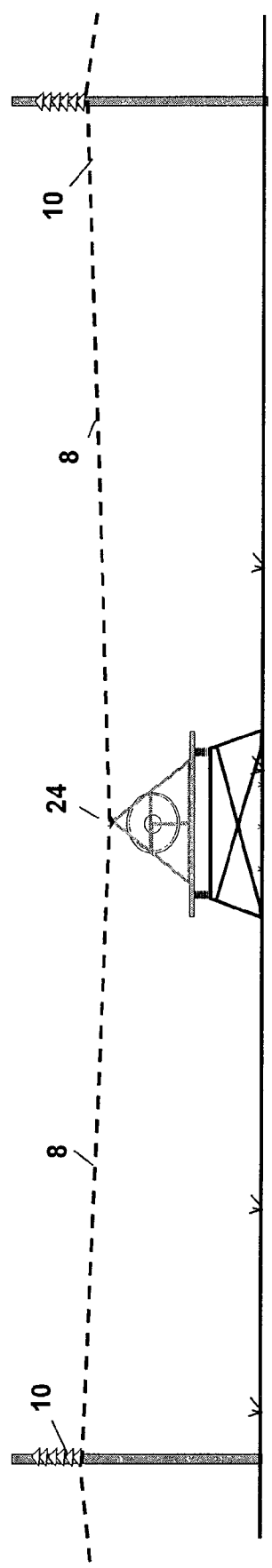
FIG. 29 illustrates Step 1 in use of the mid-span current transfer device.
Figure 30:
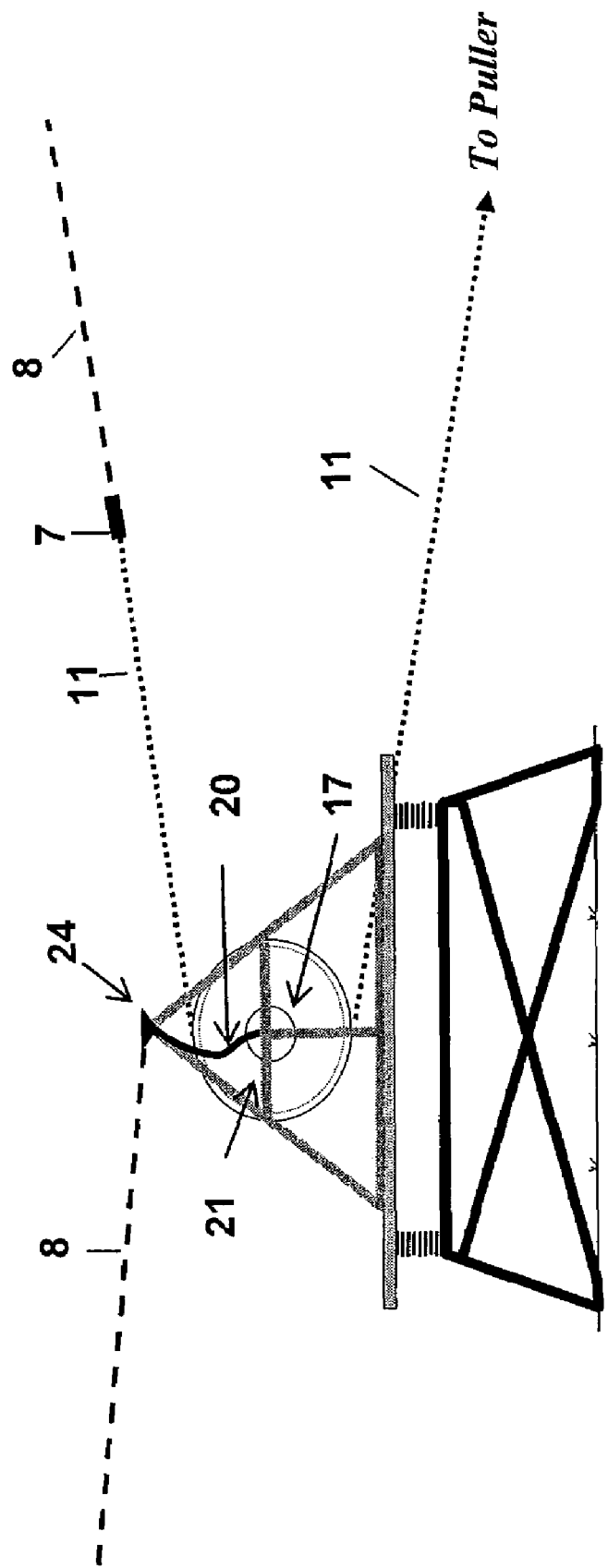
FIG. 30 illustrates the midspan current transfer device used in conjunction with a puller.

FIG. 29 shows the transfer device of FIGS. 28A, 28B, and 28C located in mid-span with the old conductor 8 drawn down to the clamp 24 preparatory to the stringing operation. FIG. 30 shows a conducting lead cable 11 attached to the old conductor 8, fed around the contact wheel 21, and to the puller. Pulling up slack on the old conductor 8 to sever it and achieve the configuration shown in FIG. 30 can be achieved by methods outlined previously. It should be noted that longitudinal tension on the transfer device will be approximately balanced throughout this transfer. The puller, which may now be comprised of standard equipment and prior art, need only be adapted for operation at line potential as discussed later.

Figure 31:
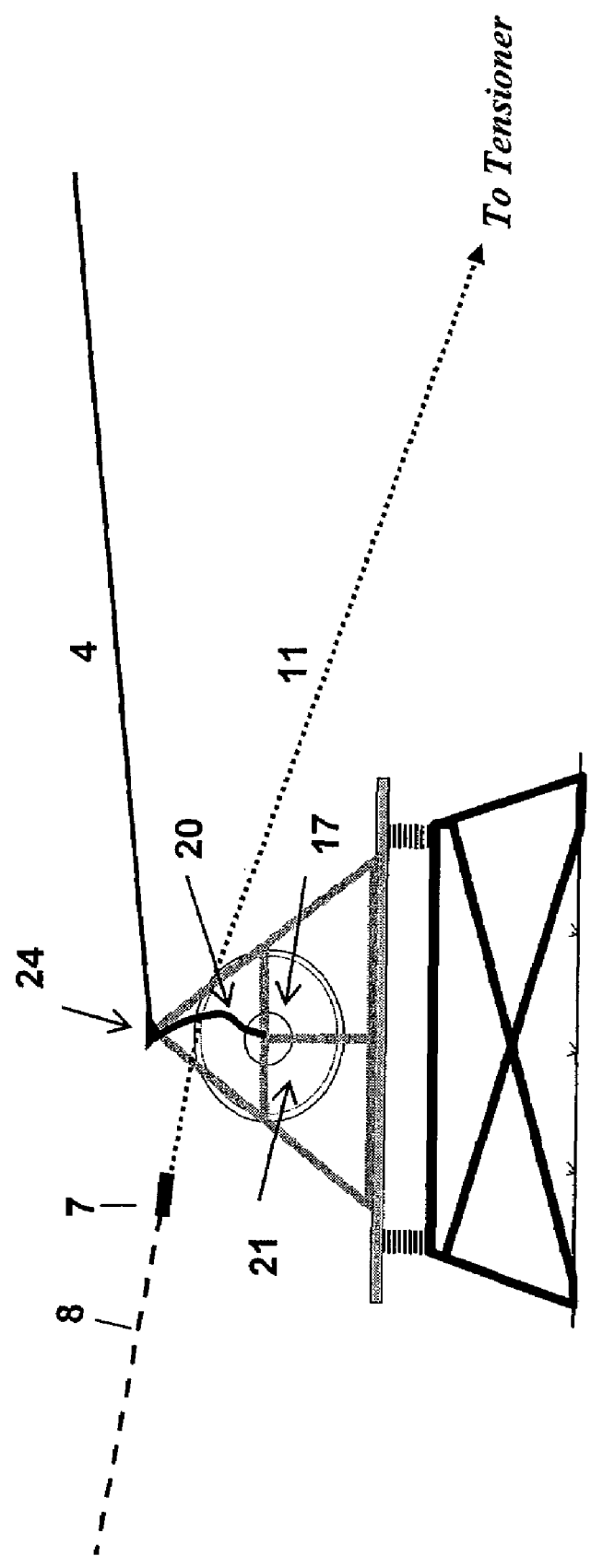
FIG. 31 illustrates the midspan current transfer device used in conjunction with a tensioner.

FIG. 31 shows the use of the same transfer device, at the same location, in conjunction with a tensioning device for the pulling section immediately to the left of the one completed while the device was used in conjunction with pulling equipment.

The previous figures presume a single three-phase transmission line with one conductor on each phase. Inasmuch as the techniques described by this invention build on methods well developed for stringing new conductors (without voltage) on new towers, there is no reason that the invention disclosed herein may not be embodied into projects and equipment for simultaneously stringing multiple conductors on each phase.

Insulation of Equipment from Ground

There are many ways in which the principles and equipment disclosed in this invention can be implemented. FIGS. 32A and 32B, for example, show a means way by which a tensioner or a puller might be mounted on a dedicated vehicle 26. Height could be reduced by recessing the bottom of the insulators into wells inherent in the truck bed design. The engines or brake assemblies could be incorporated onto the insulated platform or placed on an un-insulated trailer 28 and 29, mechanically coupled to the tensioner or puller by means of an insulated shaft 27.

FIG. 33 shows one simple manner in which tensioning or pulling equipment can be applied, i.e., by erecting a transportable platform 30 and supporting it by means of a system of insulators 32, gaining truck access by a ramp 31 that is removed once the equipment is in place.

FIGS. 34A and 34B show a collapsible platform 30 with a ground platform 34 in which the support insulators 32 are attached to pivoted support assemblies 33 which allow the platform to go from its collapsed state, as shown in FIG. 34A, to its erected state, as shown in FIG. 34B, for use.

Recognizing that personnel access may be required while the platform and equipment are at line potential, FIGS. 35A and 35B show an insulated arm 35, on the end of which is a personnel bucket 37. The insulated arm 35 is attached to swiveling platform extension 36. The arm 35 is capable of being rotated outward and downward to allow safe entrance to or egress from the high voltage platform.

Power Lines of Vertical Configuration

Figure 36:
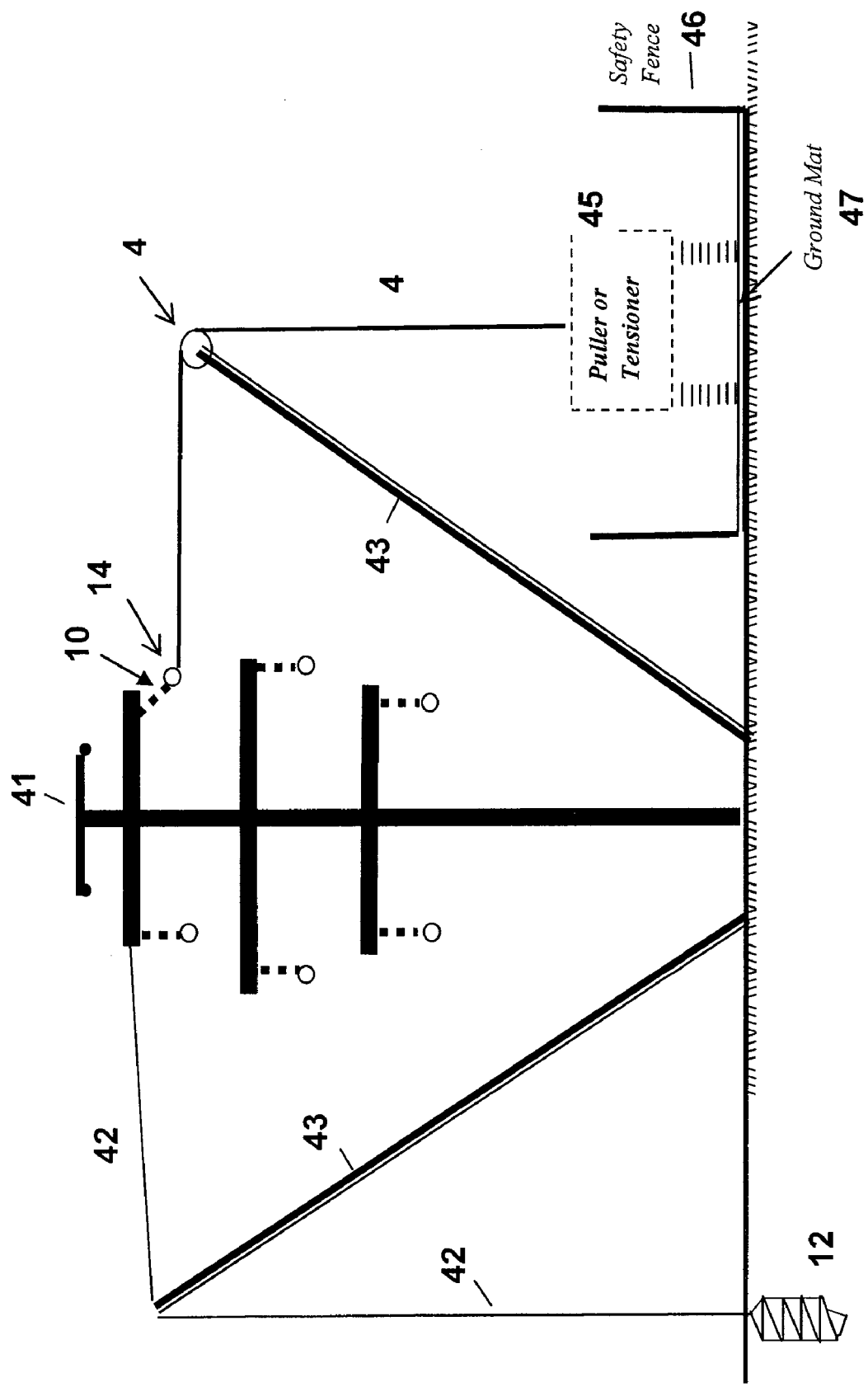
FIG. 36 illustrates a schematic of a means to achieve hot-line stringing on poles or towers of vertical configuration.

The figures previously shown presume a transmission line in which the conductors are presumed to side-by-side in a horizontal configuration. There is no reason the invention cannot be used on transmission towers on which two transmission circuits are arrayed vertically as illustrated in FIG. 36, which shows a double circuit tower 41. In this case it will be necessary to both feed and pull the new conductor from a point to the side of rather than below the conductor being replaced.

The laterally oriented tensioning and pulling may, as illustrated in FIG. 36, require use of an auxiliary block 44 suspended either from an insulated auxiliary support structure or "gin pole" 43, or from a vehicle-mounted insulated structure (not shown). The fed or pulled new conductor 4 would then pass from the above-described tensioner or puller 45 through the auxiliary block 44 to the previously described stringing block 9 longitudinally onto the line.

Pulling or tensioning in the direction shown in FIG. 36 will cause a high overturning moment on the tower and may thus require another auxiliary support structure or "gin pole" 43 to support a guy wire 42 which in turn is affixed to a temporary anchor 12 in the ground.

Description of the Preferred Short Interruption Embodiment

Figure 37:
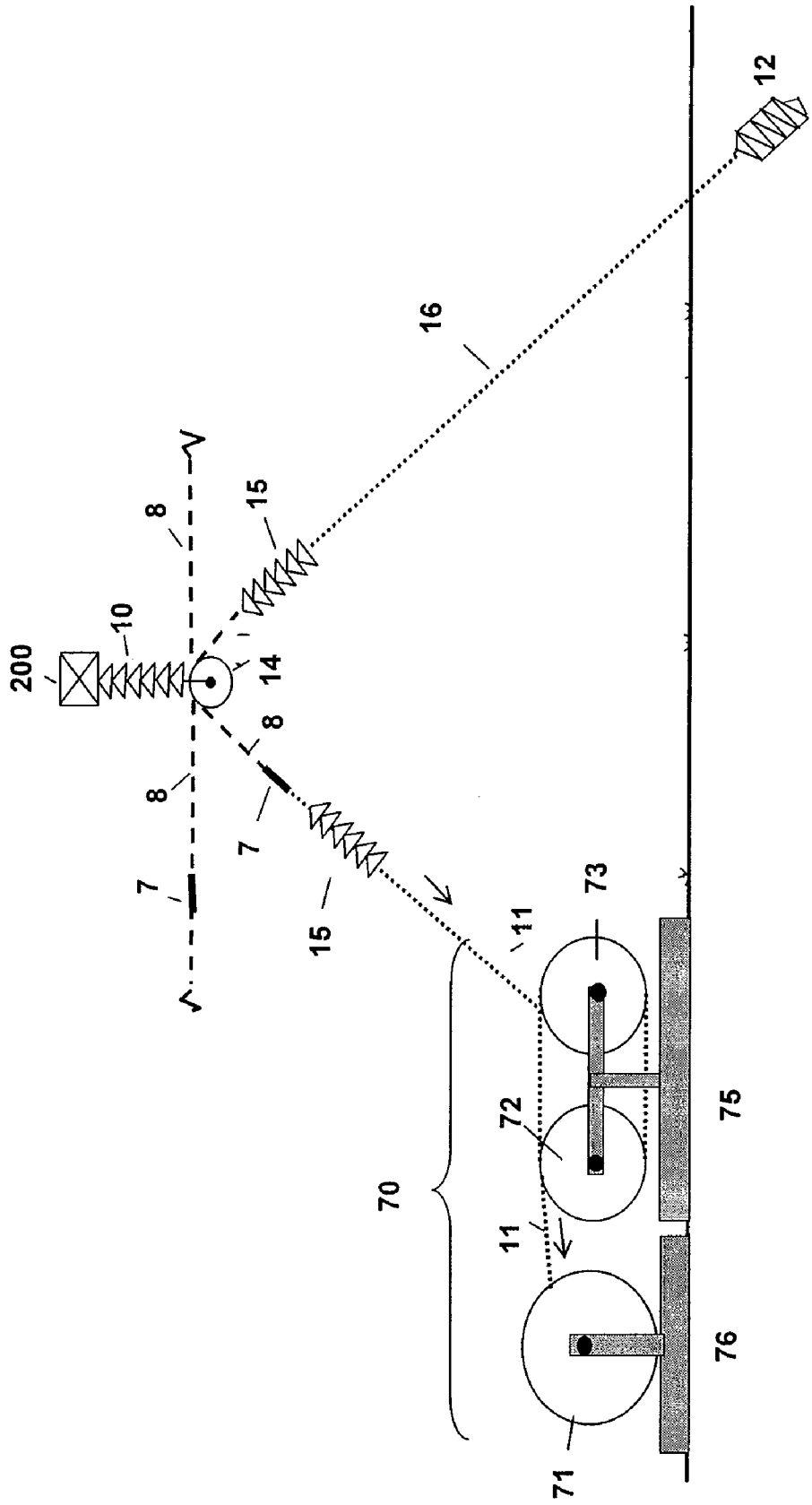
FIG. 37 illustrates an embodiment of the invention achieving limited interruption time restringing using prior art pullers and tensioners.

The procedures and equipment cited above for uninterrupted embodiment can be achieved with conventional equipment operating at ground potential if, while the line remains energized prior art hot-line methods are used to:

a. Replace permanent clamps 7 with stringing blocks 14 on all towers in the restringing line section, i.e. from tower 101 to tower 200 inclusively.

b. The procedures illustrated in FIGS. 5 through 6 are used at both ends of the pulling section except that an insulator assembly 15 is used to separate the puller or tensioner from the live conductor to which it is attached. FIG. 37 shows such a configuration for the pulling end at tower 200.

Once the configuration shown in FIG. 37 is achieved at both towers 100 and 200, the line may be de-energized, the insulator assembly 15 mechanically bypassed and removed, and conventional prior art pulling operation undertaken.

Upon completion the tie-off procedures illustrated if FIGS. 11-15 may be used, after which the line may be re-energized. Following energization, stringing blocks 14 can be replaced by permanent clamps 13, and preparations for the next section undertaken. Thus the transmission line is taken out of service during a period of light system loading for several hours while the old conductor is used to pull in the new conductor in the manner described in the no-interruption case above except with both puller and tensioner at ground potential and with no provisions for transfer of current from one conductor to another.

The foregoing has the advantage of using conventional, prior art, equipment but the disadvantage of (a) requiring line interruption during the actual pulling operation, (b) limiting the length of line which can be pulled per day with a given equipment set-up and (c) creating a risk that the transmission line will be unavailable for service if delays or difficulties are encountered in the pulling in of the new conductor.

Safety Precautions

The safety of personnel is a primary concern in any live line maintenance or construction work. The following features are therefore included in the above invention:

1. As shown in FIG. 36, elevated platforms and their immediate surrounding work area may be enclosed by a high, well grounded fence 46, and the access gate may be interlocked to prevent ingress or egress while pulling is in progress.
2. As further shown in FIG. 36, a well grounded ground mat 47 may extend over the entire area enclosed within the fence cited above to prevent danger from step potential in the event of a short circuit.
3. A means of safely entering and leaving the insulated platform while the major equipment is at line potential may be provided.
4. Low tension, high tension, and rapid tension change sensors capable of actuating high speed grounding switches at both tensioning and pulling ends of the section being strung may be provided.

There is also a risk inherent in the prospect that, during stringing, a sheave in a particular stringing block will jam, e.g. because of a sheave fracture or a stuck clamp or coupler, thus transferring the full stringing tension, intended to draw a conductor into place, to the tower on which the jam occurs. A jam of that kind can result in damage to the cross arm or even cause the tower itself to topple. This is especially important with live-line stringing, both from the standpoint of a safety and the outage cost of a line which, having justified the extra cost of live-line stringing, is obviously critical to the system.

A system to prevent such damage is illustrated in FIG. 38. FIG. 38A illustrates a special jam-sensing system consisting of a stringing block 56 preparing to rotate and to transport the new conductor 4 into position. FIG. 38B shows that once the pull has begun, some change in the suspension angle, α, of the insulator/block assembly will result from the pull. Reasonable and safe limits to α can be predicted. In FIG. 38B, the sheave of the stringing block 56 is rotating normally and the conductor 4 is moving.

Should the sheave jam either due to a fracture, sticking, or a stuck coupler, rotation of the sheave will stop, thus causing the suspension angle to increase to β as shown in FIG. 38C. This dangerous condition can be detected either by (a) increase of the suspension angle by some pre-calculated amount or (b) increase in the suspension angle of any amount and a failure of the jam-sensing sheave 56 to rotate. Both suspension angle and sheave rotation can be measured by a variety of existing prior art sensor systems.

Sensors to make such measurements, plus a microwave transmitter to send them to both pulling and tensioning positions, are shown schematically in FIG. 38 as 57. Since each pulling operation takes relatively little time, the on-board jam sensor can be battery powered. The signal from each block in a stringing section may, within certain severity limits, be cause for alarms and, within greater limits, automatic cessation of the pull.

The jam-sensing sheave system 56 can easily include measurement of sheave bearing temperature. A high temperature and/or a high rate of rise of temperature may give an early warning that a jam may be pending. The system may also be made to read conductor speed relative to the stringing block, adding to the logic of jam detection. All of the above sensing systems, taken individually, constitute prior art. Their collective use to detect and transmit a sheave jam or impending jam constitutes a part of this invention.

A variety of modifications to the embodiments described herein will be apparent to those skilled in the art from the disclosure provided herein. Thus, the invention may be embodied in other specific forms without departing from the spirit or essential attributes thereof.

I claim:

1. A system for substituting an existing high-voltage electrical power conductor with a replacement high-voltage electrical power conductor, comprising:

a coupling device that is mechanically and electrically connected to the replacement high-voltage electrical power conductor and mechanically and electrically connected to the existing high-voltage electrical power conductor, to mechanically and electrically interconnect the replacement and existing high-voltage electrical power conductors;

a first apparatus that is mechanically and electrically connected to the replacement high-voltage electrical power conductor, for supplying the replacement high-voltage electrical power conductor into the place of the existing high-voltage electrical power conductor, where the first apparatus includes a conductive portion;

a first jumper electrically connected to the conductive portion of the first apparatus and electrically connected to the existing high-voltage electrical power conductor, to electrically interconnect the first apparatus and the existing high-voltage electrical power conductor, and thus electrically interconnect the existing and replacement high-voltage electrical power conductors;

a second apparatus that is mechanically and electrically connected to the existing high-voltage electrical power conductor, for removing the existing high-voltage electrical power conductor from its location, to make room for the replacement high-voltage electrical power conductor, where the second apparatus includes a conductive portion; and a second jumper electrically connected to the conductive portion of the second apparatus and electrically connected to the existing high-voltage electrical power conductor, to electrically interconnect the second apparatus and the existing high-voltage electrical power conductor.

2. The system of claim 1 where the first apparatus and the second apparatus each include at least one conductive rotating drum that carries a high-voltage electrical power conductor, and at least one brush that conducts current to or from the drum while it rotates.

3. The system of claim 2 where the at least one rotating drum includes at least a first groove to which a high-voltage electrical power conductor is coupled, the first groove adapted to maintaining tension on the high-voltage electrical power conductor, and at least a second groove to which the high-voltage electrical power conductor is also coupled, the second groove adapted to conducting electric current to or from the high-voltage electrical power conductor.

4. The system of claim 2 where a first portion of the at least one rotating drum has a first diameter and a second portion of the at least one rotating drum has a second diameter that is larger than the first diameter.

5. The system of claim 4 where the second portion of the at least one rotating drum is adapted to cause a wiping action of the high-voltage electrical power conductor carried by the drum.

* * * * *